(12) United States Patent
Atarashi et al.

(10) Patent No.: US 8,339,010 B2
(45) Date of Patent: Dec. 25, 2012

(54) DUAL ROTOR ELECTRIC MACHINE HAVING A FIELD-CONTROLLING ROTOR

(75) Inventors: Hirofumi Atarashi, Shioya-gun (JP); Shoei Abe, Kawachi-gun (JP); Tamotsu Kawamura, Shioya-gun (JP); Hiromitsu Sato, Utsunomiya (JP)

(73) Assignee: Honda Motor Co., Ltd, Tokyo (JP)

( * ) Notice: Subject to any disclaimer, the term of this patent is extended or adjusted under 35 U.S.C. 154(b) by 551 days.

(21) Appl. No.: 12/158,533

(22) PCT Filed: Oct. 12, 2006

(86) PCT No.: PCT/JP2006/320418
§ 371 (c)(1),
(2), (4) Date: Jun. 22, 2010

(87) PCT Pub. No.: WO2007/672622
PCT Pub. Date: Jun. 28, 2007

(65) Prior Publication Data
US 2009/0096314 A1   Apr. 16, 2009

(30) Foreign Application Priority Data

Dec. 21, 2005 (JP) ................. 2005-367451

(51) Int. Cl.
*H02K 1/22*   (2006.01)
*H02K 15/00*  (2006.01)
*H02K 51/00*  (2006.01)
*H02K 49/00*  (2006.01)
*B65D 5/50*   (2006.01)

(52) U.S. Cl. ... 310/266; 310/114; 310/209; 310/156.23; 310/156.53; 310/156.12

(58) Field of Classification Search ............ 310/266, 310/273, 113, 209, 265, 267, 102 R, 114, 310/115, 156.26, 156.53, 156.36, 156.37, 310/156.12; H02K 1/22, 51/00, 15/00, 49/00, 16/00; B65D 5/50
See application file for complete search history.

(56) References Cited

U.S. PATENT DOCUMENTS 4,532,447 A * 7/1985 Cibie ........................ 310/114

(Continued)

FOREIGN PATENT DOCUMENTS

JP         2000-270503 A      9/2000

(Continued)

OTHER PUBLICATIONS

Machine translation of JP2005168127, Tajima, Jun. 2005.*

(Continued)

*Primary Examiner* — Burton Mullins
*Assistant Examiner* — Terrance Kenerly
(74) *Attorney, Agent, or Firm* — Arent Fox LLP

(57) ABSTRACT

An electric motor (10) is constructed with an inner circumference side rotor (11) and an outer circumference side rotor (12) which are coaxially arranged; and planetary gear mechanism which rotates at least one of the inner circumference side rotor (11) and the outer circumference side rotor (12) around an rotary shaft O. Long sides of substantially plate-like inner circumference side permanent magnets (11a) of the inner circumference side rotor (11) and those of substantially plate-like outer circumference side permanent magnets (12a) of the outer circumference side rotor (12) are arranged so as to face each other by the rotation of at least one of the inner circumference side rotor (11) and the outer circumference side rotor (12) in a cross section perpendicular to the rotary shaft O with the planetary gear mechanism.

23 Claims, 24 Drawing Sheets

U.S. PATENT DOCUMENTS

| | | | | |
|---|---|---|---|---|
| 4,737,674 A | * | 4/1988 | Miyao | 310/268 |
| 4,798,985 A | * | 1/1989 | Chitavat | 310/90 |
| 4,916,802 A | * | 4/1990 | Matsuzawa | 29/603.16 |
| 5,162,685 A | * | 11/1992 | Yamaguchi et al. | 310/156.28 |
| 7,932,657 B2 | * | 4/2011 | Bando et al. | 310/156.08 |
| 8,125,095 B2 | * | 2/2012 | Duffey et al. | 290/44 |
| 2002/0075121 A1 | * | 6/2002 | Akita et al. | 336/234 |
| 2003/0090167 A1 | * | 5/2003 | Kajiura et al. | 310/156.36 |
| 2004/0174082 A1 | * | 9/2004 | Graham | 310/156.12 |

FOREIGN PATENT DOCUMENTS

| | | | |
|---|---|---|---|
| JP | 2001-69701 A | | 3/2001 |
| JP | 2002-204541 A | | 7/2002 |
| JP | 2004-72978 A | | 3/2004 |
| JP | 2005-80344 A | | 3/2005 |
| JP | 2005080344 | * | 3/2005 |
| JP | 2005-124281 A | | 5/2005 |
| JP | 2005-168127 A | | 6/2005 |
| JP | 2005168127 | * | 6/2005 |
| JP | 2005-287262 A | | 10/2005 |
| JP | 2005-304193 A | | 10/2005 |
| JP | 2005304193 | * | 10/2005 |

OTHER PUBLICATIONS

Machine translation of JP2005080344, Yamaguchi, Mar. 2005.*

Machine translation of JP2005304193, Shimada et al., Oct. 2005.*

* cited by examiner

SAME POLE ARRANGEMENT: STRENGTHENING FIELD

OPPOSITE POLE ARRANGEMENT: WEAKENING FIELD

DUAL ROTOR ELECTRIC MACHINE HAVING A FIELD-CONTROLLING ROTOR

CROSS-REFERENCE TO RELATED APPLICATION

This application is a National Stage entry of International Application No. PCT/JP2006/320418, filed Oct. 12, 2006, the entire specification claims of and drawings of which are incorporated herewith by reference.

TECHNICAL FIELD

The present invention relates to an electric motor.
Priority is claimed on Japanese Patent Application No. 2005-367451, filed on Dec. 21, 2005, the content of which is incorporated herein by reference.

BACKGROUND ART

Conventionally, an electric motor is known in which there are provided a first and a second rotors that are provided concentrically around an axis of rotation of an electric motor, and the relative positions in the circumferential direction of the first and second rotors, namely, the phase difference thereof are controlled in accordance with the rotational speed of the electric motor, or in accordance with the speed of a rotating magnetic field that is generated in a stator (e.g., refer to Patent Document 1).

In this electric motor, when the phase difference between the first rotor and the second rotor is controlled in accordance with the rotational speed of the electric motor, for example, the relative positions in the circumferential direction of the first and second rotors are altered via components that become displaced in a radial direction by the action of centrifugal force. If the phase difference between the first and second rotors is controlled in accordance, for example, with the speed of the rotating magnetic field that is generated in the stator, then the relative positions in the circumferential direction of the first and second rotors are altered by altering the rotating magnetic field speed by supplying a control current to the stator coil while each rotor is maintaining its rotational speed by inertia.

Patent Document 1: Japanese Unexamined Patent Application, First Publication No. 2002-204541

DISCLOSURE OF INVENTION

Problems that the Invention is to Solve

In an electric motor according to an example of the above described conventional technology, for example, when the phase difference between the first and second rotors is controlled in accordance, for example, with the rotational speed of the electric motor, then it is only possible to control the phase difference between the first and second rotors when the electric motor is in operation, namely, when a centrifugal force corresponding to the rotational speed is in action, and the problem arises that it is not possible to control the phase difference at a suitable timing that includes when the electric motor is stopped. Moreover, in a state in which external vibration can easily affect the electric motor, such as when the electric motor is mounted as a driving source in a vehicle, then the further problem arises that it is difficult to appropriately control the phase difference between the first and second rotors solely by the action of centrifugal force. Furthermore, in this case, because the phase difference is controlled irrespective of variations in the power supply voltage of the power supply for the motor, there is a possibility, for example, that a failure will occur such as the size relationship between the power supply voltage and the counter-electromotive force of the electric motor becoming reversed.

In addition, if, for example, the phase difference between the first and second rotors is controlled in accordance with the speed of the rotating magnetic field that is generated in the stator, then because the speed of the rotating magnetic field is altered, the problem arises that processing to control the electric motor becomes extremely complex.

The present invention was conceived in view of the above described circumstances and it is an object thereof to provide an electric motor and a method of driving an electric motor in which, by making it possible to easily and appropriately vary an induced voltage constant without making the electric motor any more complex, the range of the rotational speed and the range of torque where operation is possible is enlarged and the operating efficiency is improved. In addition, the range where highly efficient operation is possible is enlarged.

Means for Solving the Problems

In order to solve the above described problems and achieve the relevant object, the electric motor according to a first aspect of the present invention includes: an inner circumference side rotor; an outer circumference side rotor having a rotary shaft that is coaxial with a rotary shaft of the inner circumference side rotor; and a rotating device capable of changing the relative phase between the inner circumference side rotor and the outer circumference side rotor by rotating at least one of the inner circumference side rotor and the outer circumference side rotor around the rotary shaft, wherein the inner circumference side rotor includes substantially plate-like inner circumference side permanent magnets arranged along a peripheral direction; the outer circumference side rotor includes substantially plate-like outer circumference side permanent magnets arranged along the peripheral direction; and the inner circumference side permanent magnets and the outer circumference side permanent magnets include long sides that face each other, in a cross section perpendicular to the rotary shaft, by the rotation of at least one of the inner circumference side rotor and the outer circumference side rotor with the rotating device.

According to the electric motor with the above configuration, with respect to the inner circumference side rotor and outer circumference side rotor each including the permanent magnets of which a cross section perpendicular to the rotary axis is substantially a rectangular shape, the long sides of the inner circumference side permanent magnets and the long sides of the outer circumference side permanent magnets are arranged to face each other when the relative phase between the inner circumference side rotor and the outer circumference side rotor is changed by the rotating device. Thereby, for example, the amount of interlinking magnetic fluxes that interlink with stator windings, out of the field fluxes generated by the outer circumference side permanent magnets, can be efficiently increased or decreased by the field fluxes generated by the inner circumference side permanent magnets. Also, for example, in a field-strengthening state, the torque constant (that is, torque/phase current) of the electric motor can be set at a relatively high value. The maximum torque value output by the electric motor can be increased, and the maximum value of the operating efficiency of the electric motor can be increased, without reducing current loss during the operation of the electric motor or changing the maximum value of the output current of an inverter that controls application of a current to the stator windings.

Moreover, in the electric motor according to a second aspect of the present invention, the inner circumference side permanent magnets are arranged on an outer peripheral surface of a core of the inner circumference side rotor; and the outer circumference side permanent magnets are buried in a core of the outer circumference side rotor.

According to the electric motor with the above configuration, the coercive force of the outer circumference side permanent magnets by the outer circumference side rotor can be improved, and the distance between the inner circumference side permanent magnets and the outer circumference side permanent magnets can be shortened, thereby efficiently increasing or decreasing the field fluxes by the permanent magnets that interlink with the stator windings.

Moreover, in the electric motor according to a third aspect of the present invention, the inner circumference side permanent magnets are buried in the core of the inner circumference side rotor; and the outer circumference side permanent magnets are buried in the core of the outer circumference side rotor.

According to the electric motor with the above configuration, both the coercive force of the outer circumference side permanent magnets by the outer circumference side rotor and the coercive force of the inner circumference side permanent magnets by the inner circumference side rotor can be improved.

Moreover, in the electric motor according to a fourth aspect of the present invention, the inner circumference side rotor and the outer circumference side rotor include a spatial portion provided in each of the cores between the inner circumference side permanent magnets that are adjacent to each other in the peripheral direction and between the outer circumference side permanent magnets that are adjacent to each other in the peripheral direction.

According to the electric motor with the above configuration, by providing a spatial portion having a relatively small magnetic permeability in the core between the permanent magnets that are adjacent to each other in the peripheral direction, it is possible to suppress the occurrence of the short-circuiting of the magnetic paths between the magnetic poles of the inner circumference side permanent magnets and the outer circumference side permanent magnets that are not in a mutually facing arrangement relationship.

Moreover, in the electric motor according to a fifth aspect of the present invention, the spatial portion includes: an inner circumference side rotor groove that is provided on an outer peripheral surface of the core of the inner circumference side rotor and extends in the direction parallel to the rotary shaft; and an outer circumference side rotor groove that is provided on the inner peripheral surface of the outer circumference side rotor and extends in the direction parallel to the rotary shaft.

According to the electric motor with the above configuration, for example, when the relative phase between the inner circumference side rotor and the outer circumference side rotor is changed by the rotating device, the inner circumference side rotor groove and the outer circumference side rotor groove are arranged so as to face each other, and thereby, the spatial portions formed by the grooves, respectively, are arranged so as to face each other. As a result, it is possible to suppress the occurrence of short-circuiting of magnetic paths between the magnetic poles of the inner circumference side permanent magnets and the outer circumference side permanent magnets that are not in a mutually facing arrangement relationship.

Moreover, in the electric motor according to a sixth aspect of the present invention, the spatial portion includes: an inner circumference side rotor groove that is provided on an outer peripheral surface of the core of the inner circumference side rotor and extends in the direction parallel to the rotary shaft; a pair of outer circumference side rotor grooves that are provided on an outer peripheral surface of the core between the outer circumference side permanent magnets that are adjacent to each other in the peripheral direction of the outer circumference side rotor and extend in the direction parallel to the rotary shaft; and a salient pole portion which is provided so as to be sandwiched between the pair of outer circumference side rotor grooves on both sides thereof in the peripheral direction.

According to the electric motor with the above configuration, the occurrence of short-circuiting of magnetic paths between the magnetic poles of the inner circumference side permanent magnets and the outer circumference side permanent magnets that are not in a mutually facing arrangement relationship can be suppressed by the grooves, and each of the rotors can be efficiently rotated by using both a magnet torque resulting from the attractive force or repulsive force generated between the rotating magnetic field of the stator windings and each of the permanent magnets, and a rotating torque, i.e., a reluctance torque, resulting from the attractive force generated between the rotating magnetic field and the salient pole portion.

Moreover, in the electric motor according to a seventh aspect of the present invention, the spatial portion provided between the outer circumference side permanent magnets extends toward the outer peripheral surface of the outer circumference side rotor from the vicinity of peripheral ends of the outer circumference side permanent magnets.

According to the electric motor with the above configuration, a reluctance torque can be generated by the core between the spatial portions that are adjacent to each other in the peripheral direction between outer circumference side permanent magnets, and the reluctance torque can be efficiently generated by these spatial portions.

Moreover, in the electric motor according to an eighth aspect of the present invention, the spatial portion is provided in the core between the outer circumference side permanent magnets.

According to the electric motor with the above configuration, the spatial portion formed in the core between the outer circumference side permanent magnets enables to improve the rigidity of the outer circumference side rotor, compared with, for example, a case where the spatial portion is opened on the outer peripheral surface of the core of the outer circumference side rotor.

Moreover, in the electric motor according to a ninth aspect of the present invention, the inner circumference side permanent magnets are arranged in positions shifted to the outer circumference side in a radial direction of the core of the inner circumference side rotor; and the outer circumference side permanent magnets are arranged in positions shifted to the inner circumference side in a radial direction of the core of the outer circumference side rotor.

According to the electric motor with the above configuration, the distance between the inner circumference side permanent magnets and the outer circumference side permanent magnets can be shortened, thereby efficiently increasing or decreasing the field fluxes by the permanent magnets that interlink stator windings.

Moreover, in the electric motor according to a tenth aspect of the present invention, the inner circumference side permanent magnets are buried in a core of the inner circumference side rotor; and the outer circumference side permanent magnets are arranged on an outer peripheral surface of a core of the outer circumference side rotor.

According to the electric motor with the above configuration, the coercive force of the inner circumference side permanent magnets by the inner circumference side rotor can be improved, and the shape of the outer circumference side rotor can be simplified.

Moreover, in the electric motor according to an eleventh aspect of the present invention, the inner circumference side permanent magnets are arranged on an outer peripheral surface of a core of the inner circumference side rotor; and the outer circumference side permanent magnets are arranged on an outer peripheral surface of a core of the outer circumference side rotor.

According to the electric motor with the above configuration, the shape of the inner circumference side rotor and the outer circumference side rotor can be simplified.

Moreover, in the electric motor according to a twelfth aspect of the present invention, a salient pole portion that protrudes radially outward from the outer peripheral surface of the core is provided between the outer circumference side permanent magnets that are adjacent to each other in the peripheral direction.

According to the electric motor with the above configuration, each of the rotors can be efficiently rotated by using both a magnet torque resulting from the attractive force or repulsive force generated between the rotating magnetic field of the stator windings and each of the permanent magnets, and a rotating torque, i.e., a reluctance torque, resulting from the attractive force generated between the rotating magnetic field, and the salient pole portion.

Moreover, in the electric motor according to a thirteenth aspect of the present invention, the inner circumference side permanent magnets are arranged on an outer peripheral surface of a core of the inner circumference side rotor; and the outer circumference side permanent magnets are arranged on an inner peripheral surface of a core of the outer circumference side rotor.

According to the electric motor with the above configuration, the distance between the inner circumference side permanent magnets and the outer circumference side permanent magnets can be shortened, thereby efficiently increasing or decreasing the field fluxes with the permanent magnets that interlink stator windings.

Moreover, the electric motor according to a fourteenth aspect of the present invention including includes: an inner circumference side salient pole portion that protrudes radially outward from the outer peripheral surface of the core between the inner circumference side permanent magnets that are adjacent to each other in the peripheral direction; an outer circumference side salient pole portion that protrudes radially inward from the inner peripheral surface of the core between the outer circumference side permanent magnets that are adjacent to each other in the peripheral direction; an inner circumference side permanent-magnet-holding claw portion that protrudes substantially in the peripheral direction from the inner circumference side salient pole portion and abuts on an outer peripheral surface end of each of the inner circumference side permanent magnets; and an outer circumference side permanent-magnet-holding claw portion that protrudes substantially in the peripheral direction from the outer circumference side salient pole portion and abuts on an inner peripheral surface end of each of the outer circumference side permanent magnets.

According to the electric motor with the above configuration, each of the rotors can be efficiently rotated by using both a magnet torque resulting from the attractive force or repulsive force generated between the rotating magnetic field of the stator windings and each of the permanent magnets, and a rotating torque, i.e., a reluctance torque, resulting from the attractive force generated between the rotating magnetic field, and the salient pole portion while the coercive force of the outer circumference side permanent magnets by the outer circumference side rotors and the coercive force of the inner circumference side permanent magnets by the inner circumference side rotor can be improved.

Moreover, the electric motor according to a fifteen aspect of the present invention further includes a substantially annular holding member in which at least one of the inner circumference side permanent magnets arranged on an outer peripheral surface of a core of the inner circumference side rotor or the outer circumference side permanent magnets arranged on an outer peripheral surface of a core of the outer circumference side rotor is sandwiched and hold on both sides thereof in the radial direction between the holding member and the outer peripheral surface of the core.

According to the electric motor with the above configuration, the inner circumference side permanent magnets and the outer circumference side permanent magnets can be held appropriately while complication of the shapes of the inner circumference side rotor and the outer circumference side rotor can be suppressed.

Moreover, in the electric motor according to a sixth aspect of the present invention, any one of the inner circumference side rotor and the outer circumference side rotor is a driving rotor that is arranged so as to face a stator and is driven by a magnetic field generated by the stator, and the other rotor is a field-controlling rotor.

According to the electric motor with the above configuration, a stator is arranged so as to face a driving rotor, and the driving rotor is the inner circumference side rotor or the outer circumference side rotor. That is, this electric motor is a so-called outer-rotor-type electric motor or inner-rotor-type electric motor. Thereby, the versatility of the electric motor can be improved.

Moreover, in the electric motor according to a seventeenth aspect of the present invention, the stator is arranged on the inner circumference side of the inner circumference side rotor; and the long sides of the outer circumference side permanent magnets provided in the outer circumference side rotor that is the field-controlling rotor are greater than those of the inner circumference side permanent magnets.

According to the electric motor with the above configuration, the electric motor is a so-called inner-rotor-type electric motor in which a stator is arranged on the inner circumference side of an inner circumference side rotor, and the inner circumference side rotor that faces the stator becomes a driving rotor. In this inner-rotor-type electric motor, the intensity of the outer circumference side permanent magnets of the outer circumference side rotor that is arranged in a position that is relatively distant from the stator can be increased, thereby increasing the amount of magnetic fluxes and expanding the variable range of an induced voltage constant of the electric motor.

Moreover, in the electric motor according to an eighteenth aspect of the present invention, the inner circumference side permanent magnets abut on an inner peripheral surface of the outer circumference side rotor.

According to the electric motor with the above configuration, the distance between the inner circumference side permanent magnets and the outer circumference side permanent magnets can be shortened, thereby reducing magnetic resistance, and expanding the variable range of an induced voltage constant of the electric motor.

Moreover, in the electric motor according to a nineteenth aspect of the present invention, the inner circumference side permanent magnets abut on an inner peripheral surface of the outer circumference side rotor.

According to the electric motor with the above configuration, the distance between the inner circumference side permanent magnets and the outer circumference side permanent magnets can be shortened, thereby reducing the magnetic resistance, and expanding the variable range of an induced voltage constant of the electric motor.

Moreover, in the electric motor according to a twentieth aspect of the present invention, abutting surfaces of the inner circumference side permanent magnets with the outer circumference side rotor are subjected to a predetermined surface treatment.

According to the electric motor with the above configuration, predetermined surface treatment performed to the abutting surfaces of the inner circumference side permanent magnets that abut the inner peripheral surface of the outer circumference side rotor enables, for example, the abutting surfaces to be smoothed. Thereby, the sliding resistance when the inner circumference side rotor and the outer circumference side rotor are relatively rotated in the peripheral direction can be reduced, and the consumption of the energy that is required for this rotation can be reduced. Further, for example by the curing of the abutting surfaces, it is possible to suppress the occurrence of problems, such as a decrease in magnetic flux by the wear of the inner circumference side permanent magnets, and an increase in magnetic resistance accompanied by an increase in distance between the inner circumference side permanent magnets and the outer circumference side permanent magnets.

Moreover, in the electric motor according to a twenty first aspect of the present invention, abutting surfaces of the inner circumference side permanent magnets with the outer circumference side rotor are subjected to a predetermined surface treatment.

According to the electric motor with the above configuration, predetermined surface treatment performed to the abutting surfaces of the inner circumference side permanent magnets that abut the inner peripheral surface of the outer circumference side rotor enables, for example, the abutting surfaces to be smoothed. Thereby, the sliding resistance when the inner circumference side rotor and the outer circumference side rotor are relatively rotated in the peripheral direction can be reduced, and consumption of the energy that is required for this rotation can be reduced. Further, for example by the curing of the abutting surfaces, it is possible to suppress the occurrence of problems, such as a decrease in magnetic flux by the wear of the inner circumference side permanent magnets, and an increase in magnetic resistance accompanied by an increase in distance between the inner circumference side permanent magnets and the outer circumference side permanent magnets.

Moreover, in the electric motor according to a twenty second aspect of the present invention, the inner peripheral surface of the outer circumference side rotor is subjected to a predetermined surface treatment.

According to the electric motor with the above configuration, a predetermined surface treatment performed to the inner peripheral surface of the outer circumference side rotor that abuts the abutting surfaces of the inner circumference side permanent magnets enables, for example, the abutting surfaces to be smoothed. Thereby, the sliding resistance when the inner circumference side rotor and the outer circumference side rotor are relatively rotated in the peripheral direction can be reduced, and the consumption of the energy that is required for this rotation can be reduced. Further, for example by the curing of the inner peripheral surface of the outer circumference side rotor, occurrence of problems, such as an increase in magnetic resistance by the wear of the outer circumference side rotor can be suppressed.

Moreover, in the electric motor according to a twenty third aspect of the present invention, the inner peripheral surface of the outer circumference side rotor is subjected to a predetermined surface treatment.

According to the electric motor with the above configuration, predetermined surface treatment performed to the inner peripheral surface of the outer circumference side rotor that abuts the abutting surfaces of the inner circumference side permanent magnets enables, for example, the abutting surfaces to be smoothed. Thereby, the sliding resistance when the inner circumference side rotor and the outer circumference side rotor are relatively rotated in the peripheral direction can be reduced, and the consumption of the energy that is required for this rotation can be reduced. Further, for example by the curing of the inner peripheral surface of the outer circumference side rotor, occurrence of problems, such as an increase in magnetic resistance by the wear of the outer circumference side rotor can be suppressed.

Moreover, in the electric motor according to a twenty fourth aspect of the present invention, the abutting surfaces of the inner circumference side permanent magnets are formed in a convex shape.

According to the electric motor with the above configuration, the abutting surfaces of the inner circumference side permanent magnets formed in a convex shape enable to reduce the sliding resistance when the inner circumference side rotor and the outer circumference side rotor are relatively rotated in the peripheral direction, and reduce the consumption of the energy that is required for this rotation.

Advantages of the Invention

With the electric motor according to the first aspect of the invention, the amount of interlinking magnetic fluxes that interlink with stator windings, out of the field fluxes generated by the outer circumference side permanent magnets, can be efficiently increased or decreased by the field fluxes generated by the inner circumference side permanent magnets. Also, for example, in a field-strengthening state, the torque constant (that is, torque/phase current) of the electric motor can be set at a relatively high value. The maximum torque value output by the electric motor can be increased, and the maximum value of the operating efficiency of the electric motor can be increased, without reducing current loss during the operation of the electric motor or without changing the maximum value of the output current of an inverter that controls application of a current to the stator windings.

Moreover, with the electric motor according to the second aspect of the invention, the coercive force of the outer circumference side permanent magnets by the outer circumference side rotor can be improved, and the distance between the inner circumference side permanent magnets and the outer circumference side permanent magnets can be shortened, thereby efficiently increasing or decreasing the field fluxes by the permanent magnets that interlink with the stator windings.

Moreover, with the electric motor according to the third aspect of the invention, the coercive force of the outer circumference side permanent magnets by the outer circumference side rotor and the coercive force of the inner circumference side permanent magnets by the inner circumference side rotor can be improved.

Moreover, with the electric motor according to the fourth aspect of the invention, it is possible to suppress the occurrence of short-circuiting of the magnetic paths between the magnetic poles of the inner circumference side permanent magnets and the outer circumference side permanent magnets that are not in a mutually facing arrangement relationship.

In addition, with the electric motor according to the fifth aspect of the invention, it is possible to further suppress the occurrence of short-circuiting of magnetic paths between the magnetic poles of the inner circumference side permanent magnets and the outer circumference side permanent magnets that are not in a mutually facing arrangement relationship.

With the electric motor according to the sixth aspect of the invention, the occurrence of short-circuiting of magnetic paths between the magnetic poles of the inner circumference side permanent magnets and the outer circumference side permanent magnets that are not in a mutually facing arrangement relationship can be suppressed by the grooves, and each of the rotors can be efficiently rotated by using both a magnet torque resulting from the attractive force or repulsive force generated between the rotating magnetic field of the stator windings and each of the permanent magnets, and a rotating torque, i.e., a reluctance torque, resulting from the attractive force generated between the rotating magnetic field and the salient pole portion.

Moreover, with the electric motor according to the seventh aspect of the invention, a reluctance torque can be generated by the core between the spatial portions that are adjacent to each other in the peripheral direction between outer circumference side permanent magnets, and the reluctance torque can be efficiently generated by these spatial portions.

In addition, with the electric motor according to the eighth aspect of the invention, the spatial portion formed in the core between the outer circumference side permanent magnets enables to improve the rigidity of the outer circumference side rotor, compared with, for example, a case where the spatial portion is opened on the outer peripheral surface of the outer circumference side rotor.

Moreover, with the electric motor according to the ninth aspect of the invention, the distance between the inner circumference side permanent magnets and the outer circumference side permanent magnets can be shortened, thereby efficiently increasing or decreasing the field fluxes by the permanent magnets that interlink stator windings.

Additionally, with the electric motor according to the tenth aspect of the invention, the coercive force of the inner circumference side permanent magnets by the inner circumference side rotor can be improved, and the shape of the outer circumference side rotor can be simplified.

Moreover, with the electric motor according to the eleventh aspect of the invention, the shape of the inner circumference side rotor and the outer circumference side rotor can be simplified.

In addition, with the electric motor according to the twelfth aspect of the invention, each of the rotors can be efficiently rotated by using both a magnet torque resulting from the attractive force or the repulsive force generated between the rotating magnetic field of the stator windings and each of the permanent magnets, and a rotating torque, i.e., a reluctance torque, resulting from the attractive force generated between the rotating magnetic field, and the salient pole portion.

Moreover, with the electric motor according to the thirteenth aspect of the invention, the distance between the inner circumference side permanent magnets and the outer circumference side permanent magnets can be shortened, thereby efficiently increasing or decreasing the field fluxes by the permanent magnets that interlink stator windings.

Moreover, with the electric motor according to the fourteenth aspect of the invention, each of the rotors can be efficiently rotated by using both a magnet torque resulting from the attractive force or repulsive force generated between the rotating magnetic field of the stator windings and each of the permanent magnets, and a rotating torque, i.e., a reluctance torque, resulting from the attractive force generated between the rotating magnetic field, and the salient pole portion while the coercive force of the outer circumference side permanent magnets by the outer circumference side rotors and the coercive force of the inner circumference side permanent magnets by the inner circumference side rotor can be improved.

Moreover, with the electric motor according to the fifteenth aspect of the invention, the inner circumference side permanent magnets and the outer circumference side permanent magnets can be held appropriately while complication of the shapes of the inner circumference side rotor and the outer circumference side rotor can be suppressed.

Moreover, with the electric motor according to the sixteenth aspect of the invention, this electric motor becomes a so-called outer-rotor-type electric motor or inner-rotor-type electric motor. Thereby, the versatility of the electric motor can be improved.

Moreover, with the electric motor according to the seventeenth aspect of the invention, the intensity of the outer circumference side permanent magnets of the outer circumference side rotor that is arranged in a position that is relatively distant from the stator can be increased, thereby increasing the amount of magnetic fluxes and expanding the variable range of an induced voltage constant of the electric motor.

Moreover, with the electric motor according to the eighteenth and nineteenth aspects of the invention, the distance between the inner circumference side permanent magnets and the outer circumference side permanent magnets can be shortened, thereby reducing magnetic resistance, and expanding the variable range of an induced voltage constant of the electric motor.

In addition, with the electric motor according to the twentieth and twenty first aspects of the invention, for example by the smoothing of the abutting surfaces, the sliding resistance when the inner circumference side rotor and the outer circumference side rotor are relatively rotated in the peripheral direction can be reduced, and the consumption of the energy that is required for this rotation can be reduced. Further by the curing of the abutting surfaces, for example, it is possible to suppress the occurrence of problems, such as a decrease in the magnetic flux by the wear of the inner circumference side permanent magnets, and an increase in the magnetic resistance accompanied by an increase in distance between the inner circumference side permanent magnets and the outer circumference side permanent magnets.

Moreover, with the electric motor according to the twenty second and twenty third aspects of the invention, for example by the smoothing of the inner peripheral surface of the outer circumference side rotor, the sliding resistance when the inner circumference side rotor and the outer circumference side rotor are relatively rotated in the peripheral direction can be reduced, and the consumption of the energy that is required for this rotation can be reduced. Further, for example by curing the inner peripheral surface of the outer circumference side rotor, it is possible to suppress the occurrence of problems, such as a decrease in the magnetic resistance accompanied by an increase in the distance between the inner circumference side permanent magnets and outer circumference side permanent magnets by the wear of the outer circumference side rotor.

Moreover, with the electric motor according to the twenty fourth aspect of the invention, the abutting surfaces of the inner circumference side permanent magnets formed in a convex shape enable to reduce the sliding resistance when the inner circumference side rotor and the outer circumference side rotor are relatively rotated in the peripheral direction, and reduce the consumption of the energy that is required for this rotation.

DESCRIPTIONS OF THE REFERENCE SYMBOLS

Figure 1:
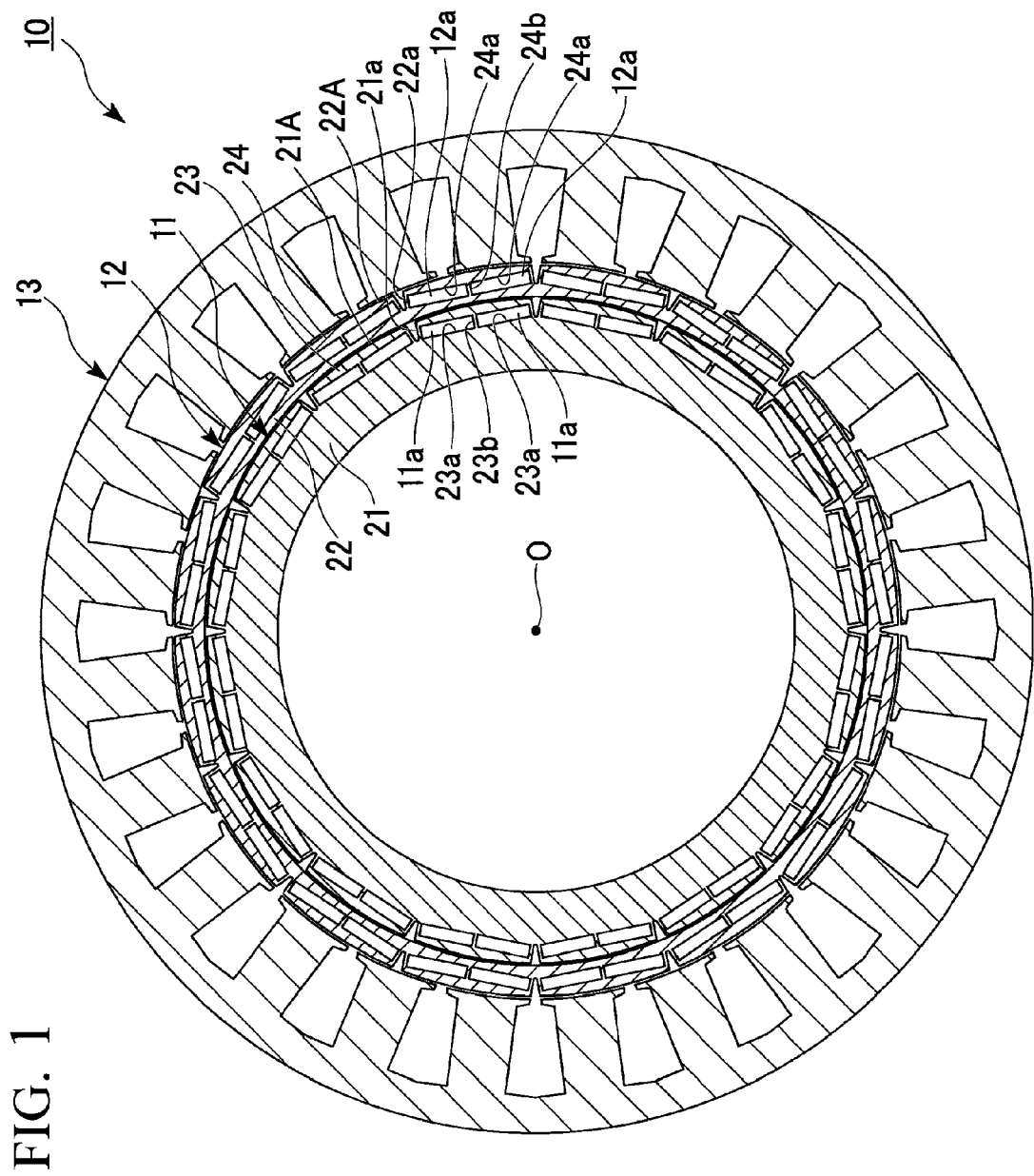
FIG. 1 is a cross-sectional view of essential parts showing an inner circumference side rotor, an outer circumference side rotor, and a stator of an electric motor according to an embodiment of the present invention.

10: Electric motor
11: Inner circumference side rotor
11a. Inner circumference side permanent magnet
12: Outer circumference side rotor
12a: Outer circumference side permanent magnet
14: Planetary gear mechanism (rotating device)
15: Actuator (rotating device)
21: Inner circumference side rotor core (core)
21a: Recess (spatial portion, inner circumference side rotor groove)
21A: Outer peripheral surface
22: Outer circumference side rotor core (core)
22a: Recess (spatial portion)
22c: Salient pole portion
22d: Recess (spatial portion, outer circumference side rotor groove)
22A: Outer peripheral surface
22B: Inner peripheral surface
25: Magnetic flux barrier hole (spatial portion)
26: Outer circumference side holding member (holding member)
27: Inner circumference side holding member (holding member)
28: Outer circumference side salient pole portion (salient pole portion)
29: Inner circumference side salient pole portion (inner circumference side salient pole portion)
29a: Magnet-holding claw portion (inner circumference side permanent-magnet-holding claw portion)
30: Salient-pole portion (outer circumference side salient pole portion)
30a: Magnet-holding claw portion (outer circumference side permanent-magnet-holding claw portion)

BEST MODE FOR CARRYING OUT THE INVENTION

Hereinafter, an embodiment of an electric motor of the present invention will be explained with reference to the accompanying drawings.

The electric motor 10 according to this embodiment, as shown in, for example, FIG. 1, is a brushless DC electric motor including a substantially annular inner circumference side rotor 11 and an outer circumference side rotor 12 having corresponding permanent magnets 11a and 12a which are arranged along a peripheral direction, a stator 13 having a plurality of phases of stator windings 13a that generate rotating magnetic fields that rotate the inner circumference side rotor 11 and the outer circumference side rotor 12, a planetary gear mechanism 14 connected to the inner circumference side rotor 11 and the outer circumference side rotor 12, and an actuator 15 that sets the relative phase between the inner circumference side rotor 11 and the outer circumference side rotor 12 by the planetary gear mechanism 14. The electric motor is mounted as a driving source on, for example, a vehicle, such as a hybrid vehicle or an electric vehicle. An output shaft P of the electric motor 10 is connected to an input shaft of a transmission (not shown) so that the driving force of the electric motor 10 may be transmitted to driving wheels (not shown) of a vehicle via the transmission.

In addition, when a driving force is transmitted to the electric motor 10 from the driving wheel side at the time of deceleration of a vehicle, the electric motor 10 functions as a power generator, and thereby generating a so-called regenerative braking force and recovering kinetic energy of a vehicle body as electrical energy (regeneration energy). Moreover, in a hybrid vehicle, for example, a rotary shaft O of the electric motor 10 is connected with a crankshaft of an internal combustion engine (not shown), and even in a case where the output of the internal combustion engine is transmitted to the electric motor 10, the electric motor 10 functions as a power generator, thereby generating power generation energy.

The inner circumference side rotor 11 and the outer circumference side rotor 12, as shown in, for example, FIG. 1, are arranged so that their rotary shafts may become coaxial with the rotary shaft O of the electric motor 10, and includes substantially cylindrical corresponding rotor cores 21 and 22, a plurality of inner circumference side magnet mounting portions 23 that are provided at predetermined intervals in the peripheral direction in an outer peripheral portion of the inner circumference side rotor core 21, and a plurality of inner circumference side magnet mounting portions 23 that are provided at predetermined intervals in the peripheral direction in the outer circumference side rotor core 22.

Also, a recess 21a that extends parallel to the rotary shaft O is formed on an outer peripheral surface 21A of the inner circumference side rotor core 21 between the inner circumference side magnet mounting portions 23 that are adjacent to each other in the peripheral direction.

Further, a recess 22a that extends parallel to the rotary shaft O is formed on an outer peripheral surface 22A of the outer circumference side rotor core 22 between the outer circumference side magnet mounting portions 24 that are adjacent to each other in the peripheral direction.

Each of the magnet mounting portions 23 includes one pair of magnet mounting holes 23a, and each of the magnet mounting portions 24 include one pair of magnet mounting holes 24a. The magnet mounting holes pass through the magnet mounting portions parallel to, for example, the rotary shaft O. One pair of magnet mounting holes 23a are arranged so as to be adjacent to each other in the peripheral direction via a center rib 23b, and the pair of magnet mounting holes 24a are arranged so as to be adjacent to each other in the peripheral direction via a center rib 24b.

In each of the magnet mounting holes 23a and 24a, a section in a direction parallel to the rotary shaft O is formed in the shape of a substantially rectangular shape having a longitudinal direction substantially in the peripheral direction and a lateral direction substantially in a radial direction. The magnet mounting holes 23a and 24a are mounted with the corresponding permanent magnets 11a and 12a having a substantially rectangular plate shape that extends parallel to the rotary shaft O.

One pair of inner circumference side permanent magnets 11a that are mounted on one pair of magnet mounting holes 23a are magnetized in a thickness direction (that is, the radial direction of each of the rotors 11 and 12), and are set so that their magnetizing directions may become the same direction. Also, as for the inner circumference side magnet mounting portions 23 that are adjacent to each other in the peripheral direction, one pair of inner circumference side permanent magnets 11a that are mounted on one pair of magnet mounting holes 23a are set so that they may be magnetized in different directions. That is, an inner circumference side magnet mounting portion 23 mounted with one pair of inner circumference side permanent magnets 11a having S poles on their outer circumference side is adjacent to an inner circumference side magnet mounting portion 23 mounted with one pair of inner circumference side permanent magnets 11a having N poles on their outer circumference side, via the recess 21a in the peripheral direction.

Similarly, one pair of outer circumference side permanent magnets 12a that are mounted on one pair of magnet mounting holes 24a are magnetized in the thickness direction (that is, the radial direction of each of the rotors 11 and 12), and are set so that they may be magnetized in the same direction. Also, as for the outer circumference side magnet mounting portions 24 that are adjacent to each other in the peripheral direction, one pair of outer circumference side permanent magnets 12a that are mounted on one pair of magnet mounting holes 24a are set so that they may be magnetized in different directions. That is, an outer circumference side magnet mounting portion 24 mounted with one pair of an outer circumference side permanent magnet 12a and an outer circumference side permanent magnet 12a having N poles on their outer circumference side is adjacent to an outer circumference side magnet mounting portion 24 mounted with one pair of outer circumference side permanent magnets 12a having S poles on their outer circumference side, via the recess 22a in the peripheral direction.

Also, each magnet mounting portion 23 of the inner circumference side rotor 11 and each magnet mounting portion 24 of the outer circumference side rotor 12 are arranged so that each recess 21a of the inner circumference side rotor 11 and each recess 22a of the outer circumference side rotor 12 may face each other in the radial direction of each of the rotors 11 and 12.

Thereby, the electric motor 10 can be set to proper states ranging from a field-weakening state where the same magnetic poles of the inner circumference side permanent magnets 11a of the inner circumference side rotor 11 and the outer circumference side permanent magnets 12a of the outer circumference side rotor 12 are arranged to face each other (that is, the inner circumference side permanent magnets 11a and the outer circumference side permanent magnets 12a have an opposite pole arrangement) to a field-strengthening state where different magnetic poles of the inner circumference side permanent magnets 11a of the inner circumference side rotor 11 and the outer circumference side permanent magnets 12a of the outer circumference side rotor 12 are arranged to face each other (that is, the inner circumference side permanent magnets 11a and the outer circumference side permanent magnets 12a have a same pole arrangement), according to the relative position around the rotary shaft O of the inner circumference side rotor 11 and the outer circumference side rotor 12.

Particularly in the field-weakening state and field-strengthening state, long sides of the inner circumference side permanent magnets 11a and long sides of the outer circumference side permanent magnets 12a may be set so as to face each other in a cross section perpendicular to the rotary shaft O.

Further, the stator 13 is formed in a substantially cylindrical shape that is arranged to face an outer peripheral portion of the outer circumference side rotor 12, and is fixed to, for example, a housing (not shown) of the transmission of a vehicle, or the like.

Figure 2:
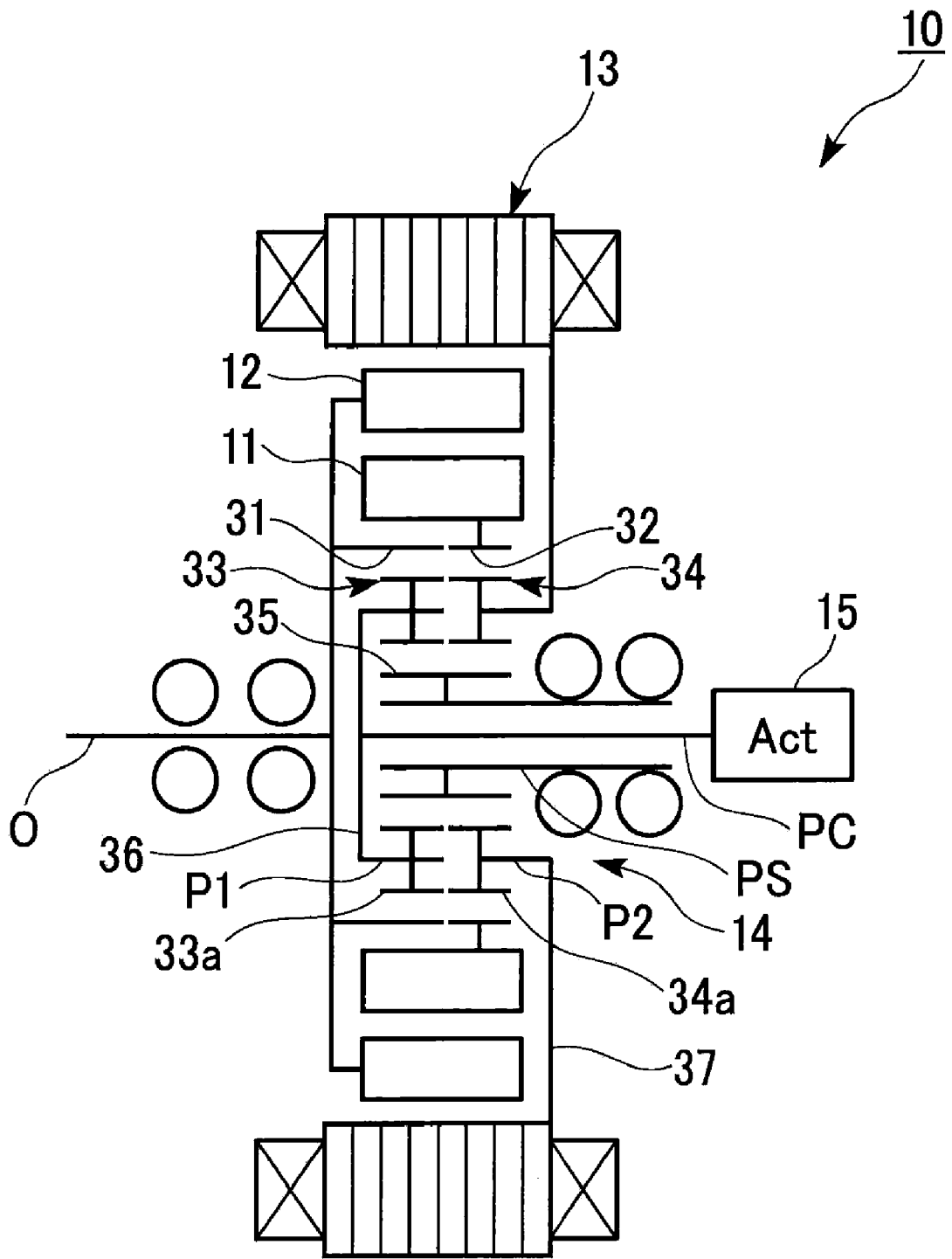
FIG. 2 is a view schematically showing the configuration of the electric motor according to the embodiment of the present invention.

The planetary gear mechanism 14, as shown in, for example FIG. 2, includes a first ring gear (R1) 31 that is arranged in a hollow portion on the inner circumference side of the inner circumference side rotor 11 and is formed coaxially and integrally with the outer circumference side rotor 12, a second ring gear (R2) 32 that is formed coaxially and integrally with the inner circumference side rotor 11, a single-row first planetary gear train 33 that meshes with the first ring gear (R1) 31, a single-row second planetary gear train 34 that meshes with the second ring gear (R2) 32, a sun gear (S) 35 that is an idle gear that meshes with the first planetary gear train 33 and the second planetary gear train 34, a first planetary carrier (C1) 36 that rotatably supports any one of the first planetary gear train 33 and the second planetary gear train 34, for example, a plurality of first planetary gears 33a that constitute the first planetary gear train 33 around each first planetary rotary shaft P1, and is made rotatable around the rotary shaft O, and a second planetary carrier (C2) 37 that rotatably supports the other one of the first planetary gear train 33 and the second planetary gear train 34, for example, a plurality of second planetary gears 34a that constitute the second planetary gear train 34, around each second planetary rotary shaft P2, and is fixed to the stator 13.

That is, the planetary gear mechanism 14 is a single-pinion-type planetary gear mechanism including the single-row first planetary gear train 33 and the single-row second planetary gear train 34.

In the planetary gear mechanism 14, the external diameter of the inner circumference side rotor 11 is made smaller than the internal diameter of the outer circumference side rotor 12, and the inner circumference side rotor 11 is arranged in a hollow portion on the inner circumference side of the outer circumference side rotor 12. The external diameter of each of the first ring gear (R1) 31 and the second ring gear (R2) 32 is made smaller than the internal diameter of the inner circumference side rotor 11, and the first ring gear (R1) 31 and the second along ring gear (R2) 32 that are coaxially arranged so as to be adjacent to each other along a direction parallel to the rotary shaft O are arranged in a hollow portion on the inner circumference side of the inner circumference side rotor 11.

Also, with respect to the arrangement position of the second ring gear (R2) 32, the first ring gear (R1) 31 that is arranged in a position shifted to one side in the direction parallel to the rotary shaft O is rotatably supported by a bearing, and is connected to the rotary shaft O that extends toward one side.

Also, with respect to the arrangement position of the first planetary gear train 33 that meshes with the first ring gear (R1) 31, the first planetary carrier (C1) 36 is arranged in a position shifted to one side in a direction parallel to the rotary shaft O, is rotatably inserted through a hollow portion of a rotary shaft PS of the sun gear (S) 35 that is formed in a hollow shape, and is connected to a rotary shaft PC that extends to the other side.

Further, with respect to the arrangement position of the second planetary gear train 34 that meshes with the second ring gear (R2) 32, the second planetary carrier (C2) 37 is arranged in a position shifted toward the other side in a direction parallel to the rotary shaft O.

In the planetary gear mechanism 14, the first ring gear (R1) 31 and the second ring gear (R2) 32 have almost the same gear shape, each of the plurality of first planetary gears 33a that constitute the first planetary gear train 33 and each of the plurality of second planetary gears 34a that constitute the second planetary gear train 34 have almost the same gear shape, and the rotary shaft PS of sun gear (S) 35 is arranged coaxially with the rotary shaft O of the electric motor 10, and is rotatably supported by a bearing. Thereby, the first planetary gear train 33 and the second planetary gear train 34 mesh with the sun gear (S) 35 that is an idle gear, thereby making the inner circumference side rotor 11 and the outer circumference side rotor 12 to rotate synchronously.

Moreover, the rotary shaft PC of the first planetary carrier (C1) 36 is arranged coaxially with the rotary shaft O of the electric motor 10, and is connected to the actuator 15, and the second planetary carrier (C2) 37 is fixed to the stator 13.

Also, the actuator 15 is controlled according to a control command input from, for example, an external control device or the like, and includes a hydraulic pump 15a that converts fluid energy into a rotational motion. The actuator regulates the rotation of the first planetary carrier (C1) 36 around the rotary shaft O (that is, holds the first planetary carrier (C1) 36 in a predetermined rotational position, or makes the first planetary carrier (C1) 36 rotate by a predetermined rotational angle in a forward direction or in a reverse direction around the rotary shaft O by an advance operation or a retard operation. Thereby, if the first planetary carrier (C1) 36 is rotated around the rotary shaft O by the actuator 15, the relative phase between the inner circumference side rotor 11 and the outer circumference side rotor 12 changes irrespective of the operating state or the stopped state of the electric motor 10.

Figure 3:
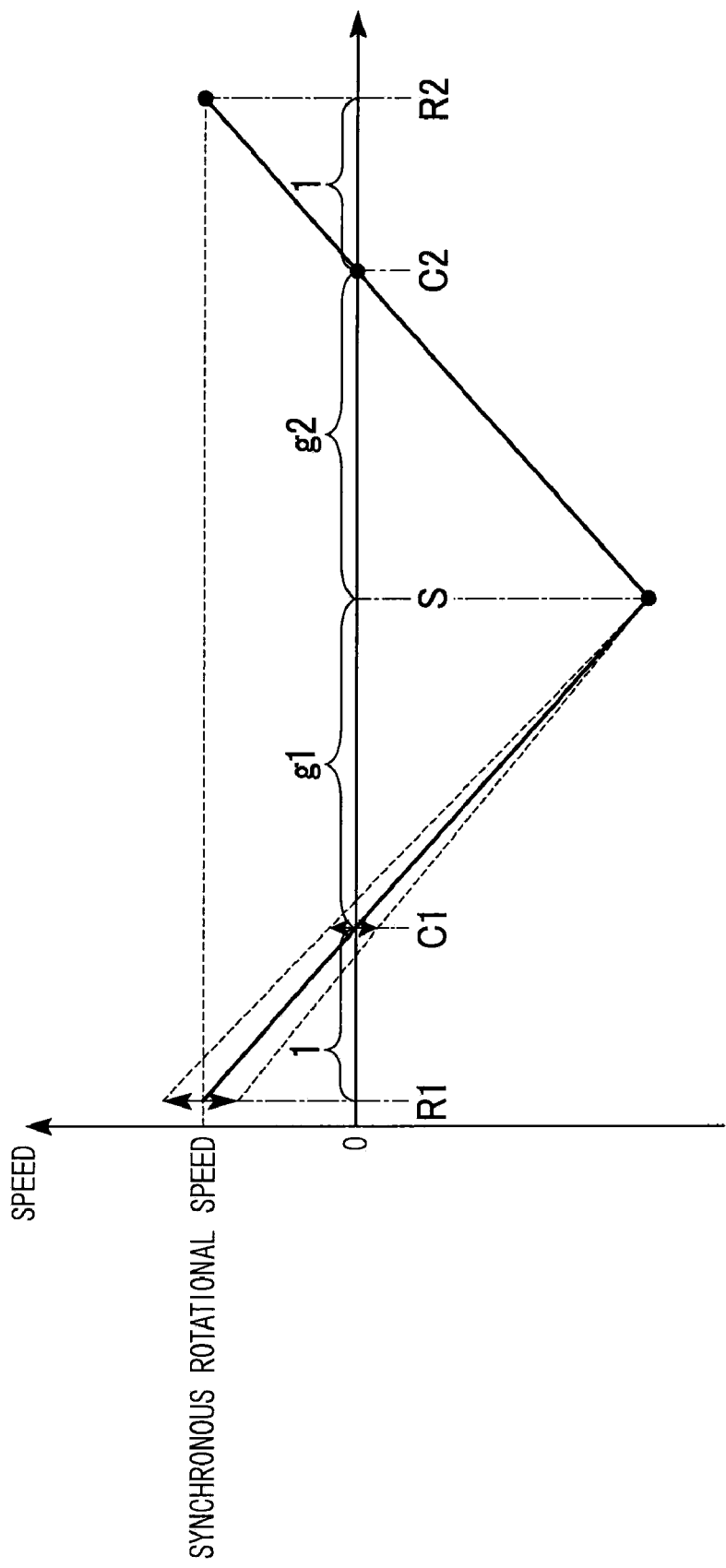
FIG. 3 is a velocity diagram of a planetary gear mechanism according to the embodiment of the present invention.

For example, the rotational speed of the second planetary carrier (C2) 37 around the rotary shaft O is zero irrespective of the operating state of the actuator 15 like the rotational state of the sun gear (S) 35 shown in FIG. 3. For this reason, the second ring gear (R2) 32 and the inner circumference side rotor 11 rotates in the forward direction at a speed according to the gear ratio (speed increasing ratio) g2 of the sun gear (S) 35 to the second ring gear (R2) 32 in contrast with, for example, the sun gear (S) 35 that rotates at a proper speed in the reverse direction.

Also, in the non-operating state of the actuator 15, the rotational speed of the first planetary carrier (C1) 36 around the rotary shaft O is zero. For this reason, the first ring gear (R1) 31 and the outer circumference side rotor 12 rotates in the forward direction at a speed according to the gear ratio (speed increasing ratio) g1 of the sun gear (S) 35 to the first ring gear (R1) 31 in contrast with, for example, the sun gear (S) 35 that rotates at proper speed in the reverse direction. Here, since the gear ratio g1 and the gear ratio g2 are approximately equal to each other (g1≅g2), the inner circumference side rotor 11 rotates in synchronism with the outer circumference side rotor 12, and consequently, the relative phase between the inner circumference side rotor 11 and the outer circumference side rotor 12 is maintained without any change.

On the other hand, in the operating state (that is, a state where an advance operation or a retard operation is executed) of the actuator 15, the rotational speed of the first planetary carrier (C1) 36 around the rotary shaft O is a value other than zero, i.e., a proper positive value or negative value in the forward direction or the reverse direction. For this reason, the first ring gear (R1) 31 and the outer circumference side rotor 12 rotates in the forward direction at a faster or slower speed than a speed according to the gear ratio (speed increasing ratio) g1 of the sun gear (S) 35 to the first ring gear (R1) 31 in contrast with, for example, the sun gear (S) 35 that rotates at proper speed in the reverse direction. Here, since the gear ratio g1 and the gear ratio g2 are approximately equal to each other (g1≅g2), the outer circumference side rotor 12 is accelerated or decelerated compared with the inner circumference side rotor 11, and the relative phase between the inner circumference side rotor 11 and the outer circumference side rotor 12 is changed.

With respect to the gear ratio (that is, speed increasing ratio) g1 of the sun gear (S) 35 to the first ring gear (R1) 31, and the number P of pole pairs of the electric motor 10, the actuator 15 is able to rotate the first planetary carrier (C1) 36 by at least a mechanical angle $\theta(°)=(180/p) \times g1 \times (1+g1)$ in the forward direction or the reverse direction around the rotary shaft O.

Thereby, the relative phase between the inner circumference side rotor 11 and the outer circumference side rotor 12 can be changed to advance angle side or retard angle side by an electrical angle of 180°, and the state of an electric motor 10 can be set to proper states ranging from a field-weakening state where the same magnetic poles of the inner circumference side permanent magnets 11a of the inner circumference side rotor 11 and the outer circumference side permanent magnets 12a of the outer circumference side rotor 12 are arranged to face each other (that is, the inner circumference side permanent magnets 11a and the outer circumference side permanent magnets 12a have an opposite pole arrangement) to a field-strengthening state where different magnetic poles of the inner circumference side permanent magnets 11a of the inner circumference side rotor 11 and the outer circumference side permanent magnets 12a of the outer circumference side rotor 12 are arranged to face each other (that is, the inner circumference side permanent magnets 11a and the outer circumference side permanent magnets 12a have a same pole arrangement).

Figure 4A:
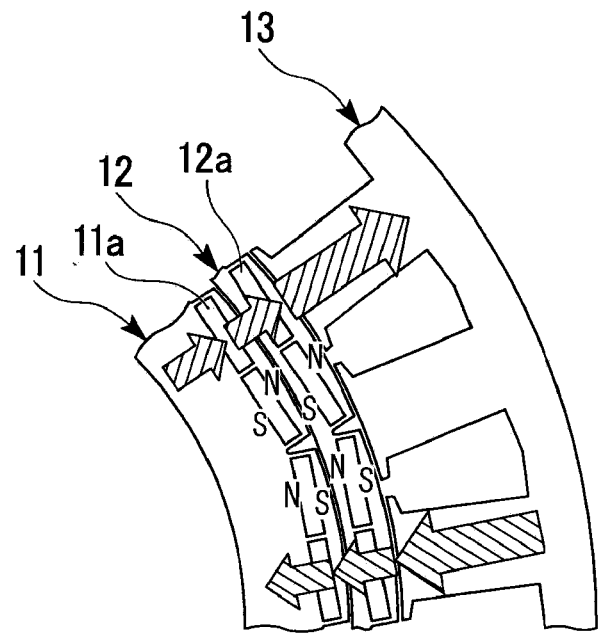
FIG. 4A is a view schematically showing a field-strengthening state where the permanent magnets of the inner circumference side rotor and the permanent magnets of the outer circumference side rotor according to the embodiment of the present invention have a same pole arrangement.
Figure 4B:
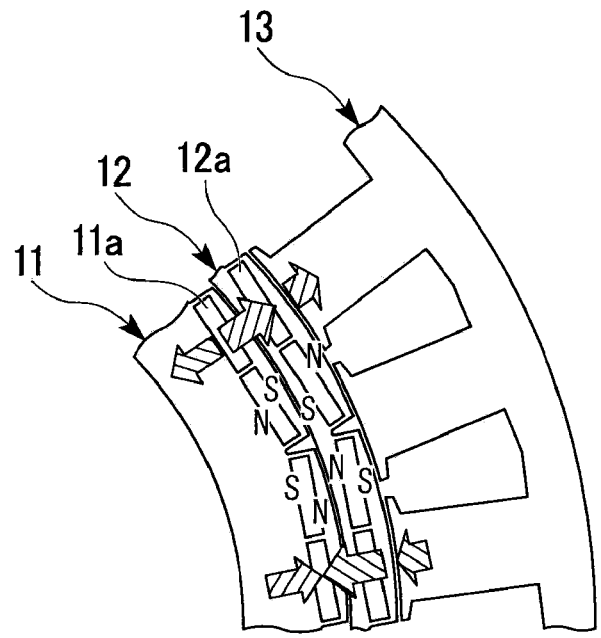
FIG. 4B is a view schematically showing a field-weakening state where the permanent magnets of the inner circumference side rotor and the permanent magnets of the outer circumference side rotor according to the embodiment of the present invention have an opposite pole arrangement.
Figure 5:
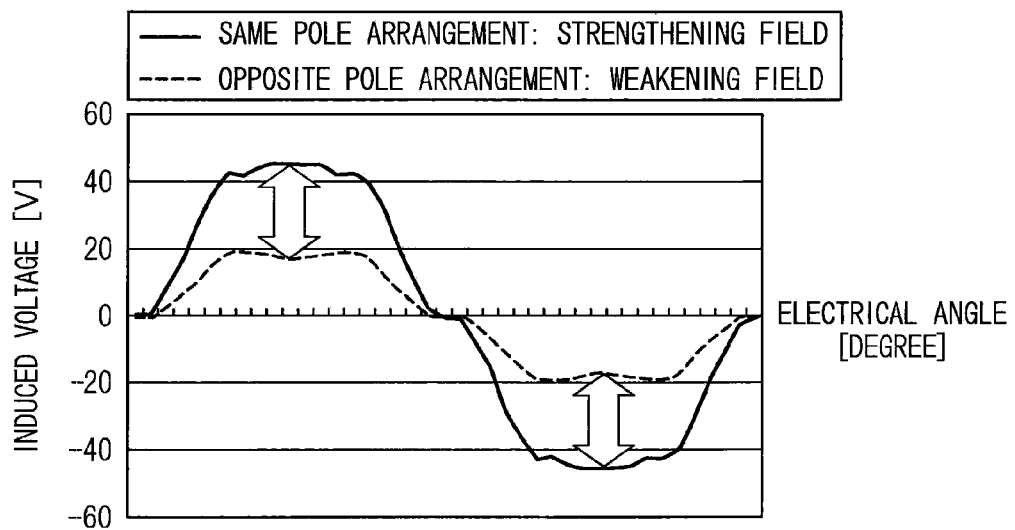
FIG. 5 is a graph showing an induced voltage in the field-strengthening state shown in FIG. 4A and in the field-weakening state shown in FIG. 4B.

In the field-strengthening state where the inner circumference side permanent magnets 11a of the inner circumference side rotor 11 and the outer circumference side permanent magnets 12a of the outer circumference side rotor 12 have the same pole arrangement as shown in, for example, FIG. 4A, and in the field-weakening state where the inner circumference side permanent magnets 11a of the inner circumference side rotor 11 and the outer circumference side permanent magnets 12a of the outer circumference side rotor 12 have an opposite pole arrangement as shown in, for example, FIG. 4B, the intensity of an induced voltage changes as shown in, for example, FIG. 5. Therefore, an induced voltage constant Ke is changed by changing the state of the electric motor 10 between the field-strengthening state and the field-weakening state.

The induced voltage constant Ke is, for example, a rotational frequency ratio of an induced voltage induced by winding ends of the stator windings 13a by the rotation of each of the rotors 11 and 12, and can be described as $$Ke = 8 \times p \times R \times L \times B \times T \times \pi$$

by the multiplication of the number p of pole pairs, the external diameter R of an electric motor, electric motor stacking thickness L, magnetic flux density B, and the number T of turns. Thereby, by changing the state of the electric motor 10 between the field-strengthening state and the field-weakening state, the intensity of the magnetic flux density B of a field flux by the inner circumference side permanent magnets 11a of the inner circumference side rotor 11 and the outer circumference side permanent magnets 12a of the outer circumference side rotor 12 changes, and the induced voltage constant Ke is changed.

Figure 6A:
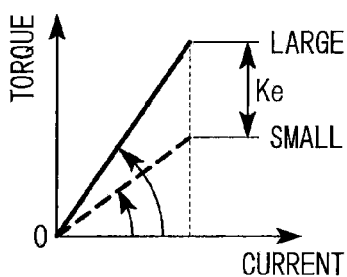
FIG. 6A is a graph showing the relationship between the current and torque of the electric motor that change in accordance with an induced voltage constant Ke according to the embodiment of the present invention.

Here, as shown in, for example, FIG. 6A, the torque of the electric motor 10 is proportional to the multiplication of the induced voltage constant Ke and a current applied to the stator windings 13a (Torque ∝ (Ke×Current)).

Figure 6B:
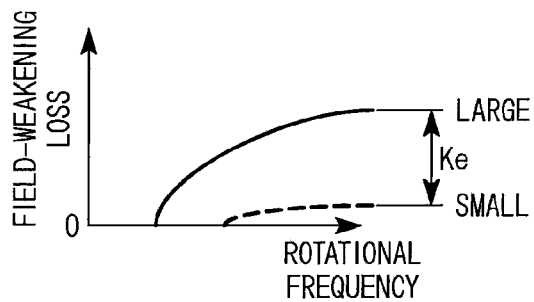
FIG. 6B is a graph showing the relationship between the rotational frequency and field-weakening loss of the electric motor that changes in accordance with the induced voltage constant Ke according to the embodiment of the present invention.

Further, as shown in, for example, FIG. 6B, the field-weakening loss of the electric motor 10 is proportional to the multiplication of the induced voltage constant Ke and a rotational frequency (Field-weakening loss ∝ (Ke×Rotational frequency)). Therefore, the allowable rotational frequency of the electric motor 10 is proportional to the inverse number of the multiplication of the induced voltage constant Ke and the rotational frequency (Allowable rotational frequency ∝ (1/(Ke×Rotational frequency))).

Figure 7:
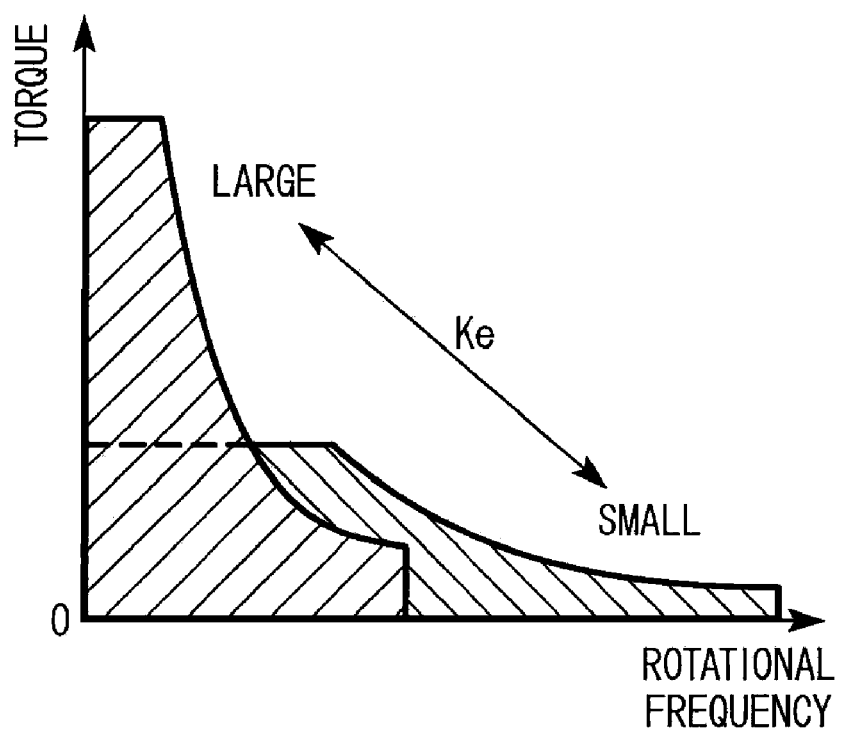
FIG. 7 is a view showing an operational region relevant to the rotational frequency and torque of the electric motor that change in accordance with to the induced voltage constant Ke.

That is, as shown in, for example, FIG. 7, in the electric motor 10 in which the induced voltage constant Ke is relatively large, the operational rotational frequency is relatively low, but it is possible to output a relatively large torque. On the other hand, in the electric motor 10 in which the induced voltage constant Ke is relatively small, the torque that can be output is relatively low, but operation at a relatively high rotational frequency becomes possible. As a result, an operational region relevant to a torque and a rotational frequency changes according to the induced voltage constant Ke.

Figure 8A:
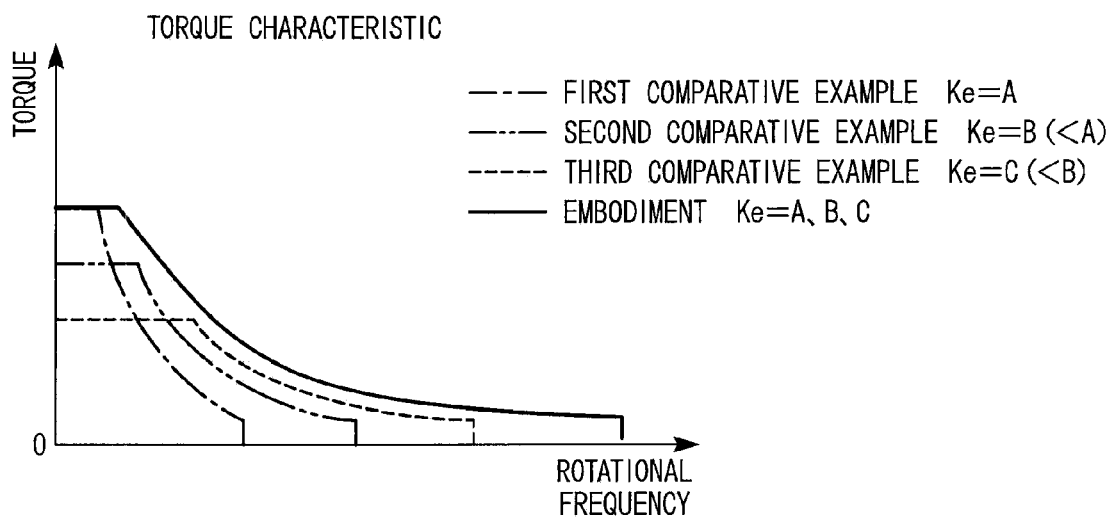
FIG. 8A is a graph showing the relationship between the rotational frequency and torque of the electric motor that change in accordance with the induced voltage constant Ke according to the embodiment of the present invention.

For this reason, like an embodiment shown in, for example, FIG. 8A, by making a setting so that the induced voltage constant Ke may change to a falling tendency as the rotational frequency of the electric motor 10 increases (e.g., change to A, B (<A), and C (<B)), an operational region relevant to a torque and a rotational frequency is expanded, compared with a case (e.g., first to third comparative examples) where the induced voltage constant Ke is not changed.

Figure 8B:
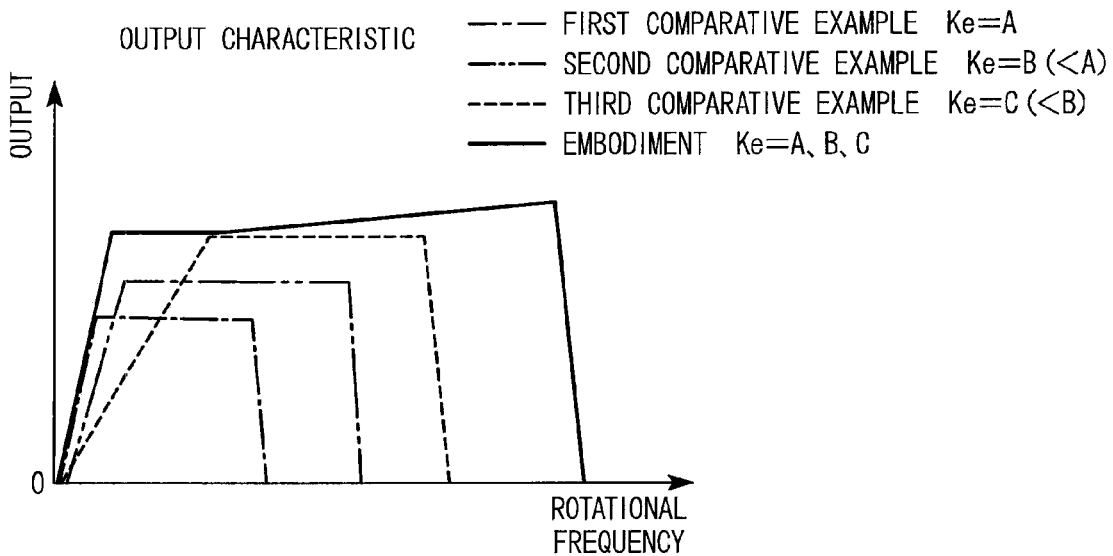
FIG. 8B is a graph showing the relationship between the rotational frequency and output of the electric motor that change in accordance with the induced voltage constant Ke according to the embodiment of the present invention.

Further, the output of the electric motor 10 is proportional to a value that is obtained by subtracting the field-weakening loss and other losses from the multiplication of the induced voltage constant Ke, a current applied to the stator windings 13a, and rotational frequency (Output ∝ (Ke×Current×Rotational frequency−Field-weakening loss−Other losses)). That is, as shown in, for example, FIG. 8B, in the electric motor 10 in which the induced voltage constant Ke is relatively large, an operational rotational frequency falls relatively, but the output in a relatively low rotational frequency region increases. On the other hand, in the electric motor 10 in which the induced voltage constant Ke is relatively small, the output in a relatively low rotational frequency region decreases, but the operation to a relatively high rotational frequency becomes possible, and the output at a relatively high rotational frequency increases. As a result, an operational region relevant to an output and a rotational frequency changes according to the induced voltage constant Ke. For this reason, by making a setting so that the induced voltage constant Ke may change to a falling tendency as the rotational frequency of the electric motor 10 increases (e.g., change to A, B (<A), and C (<B)), an operational region relevant to an output and a rotational frequency is expanded, compared with a case (e.g., the first to third comparative examples) where the induced voltage constant Ke is not changed.

Further, the efficiency of the electric motor 10 is proportional to a value that is obtained by subtracting a copper loss, the field-weakening loss, and other losses from the input power to the stator windings 13a (Efficiency ∝ ((Input power−Copper loss−Field-weakening loss−Other losses)/Input power)).

For this reason, by selecting a relatively large induced voltage constant Ke in a relatively low rotational frequency region to a middle rotational frequency region, the current that is required to output a desired torque decreases, and the copper loss decreases.

Also, by selecting a relatively small induced voltage constant Ke in the middle rotational frequency region to a relatively high rotational frequency region, the field-weakening current decreases, and the field-weakening loss decreases.

Figure 9A:
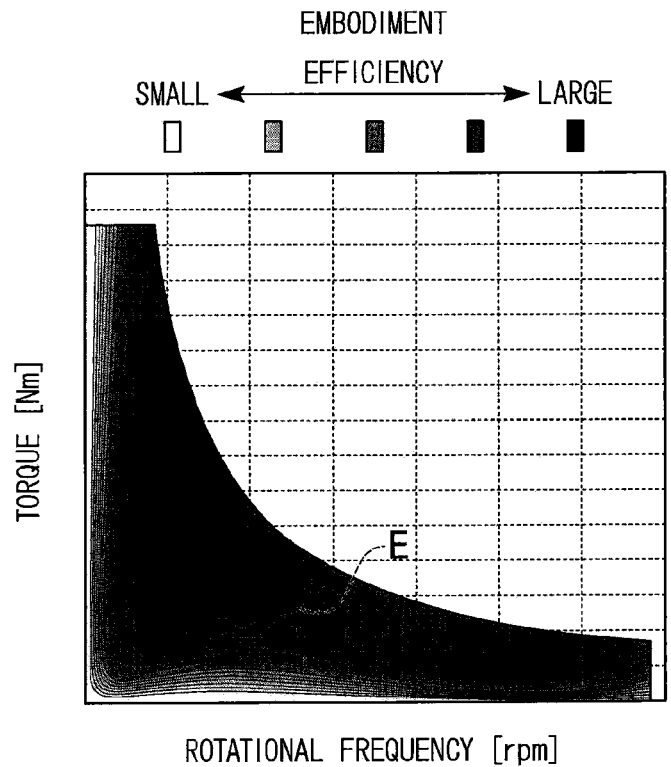
FIG. 9A is a view showing an operational region and the efficiency distribution relevant to the rotational frequency and torque of the electric motor that change in accordance with the induced voltage constant Ke in the embodiment.
Figure 9B:
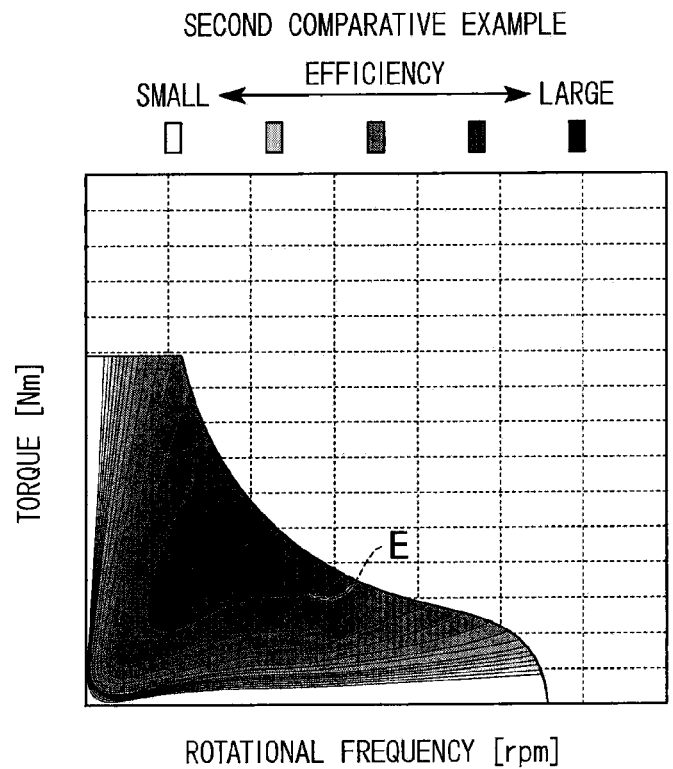
FIG. 9B is a view showing an operational region and efficiency distribution relevant to the rotational frequency and torque of the electric motor that change in accordance with the induced voltage constant Ke in a second comparative embodiment.

Thereby, like an embodiment shown in, for example, FIG. 9A, by making a setting so that the induced voltage constant Ke may change to a falling tendency as the rotational frequency of the electric motor 10 increases, an operational region relevant to a rotational frequency and a rotational frequency is expanded, an efficient region E where the efficiency of the electric motor 10 becomes a predetermined efficiency or more is expanded, and the value of maximum efficiency that is reachable increases, compared with a case (for example (e.g., the second comparative example) where the induced voltage constant Ke is not changed.

In addition, the actuator 15 is able to release regulation of the rotation of the first planetary carrier (C1) 36 around the rotary shaft O. For example, in a case where the abnormality of the electric motor 10 is detected, the actuator releases the regulation of the rotation of the first planetary carrier (C1) 36, and allows the rotation of the first planetary carrier (C1) 36 around the rotary shaft O.

That is, if the regulation of the rotation of the first planetary carrier (C1) 36 by the actuator 15 is released, the first planetary carrier (C1) 36 becomes freely rotatable around the rotary shaft O. In this state, the relative positions of the inner circumference side rotor 11 and the outer circumference side rotor 12 in the peripheral direction are changed by the repulsive force between the same magnetic poles of the inner circumference side permanent magnets 11a of the inner circumference side rotor 11 and the outer circumference side permanent magnets 12a of the outer circumference side rotor 12, or by the attractive force between the different magnetic poles of the inner circumference side permanent magnets 11a of the inner circumference side rotor 11 and the outer circumference side permanent magnets 12a of the outer circumference side rotor 12, and the state of the electric motor 10 changes to a field-strengthening state where the different magnetic poles of the inner circumference side permanent magnets 11a of the inner circumference side rotor 11 and the outer circumference side permanent magnets 12a of the outer circumference side rotor 12 are arranged to face each other (that is, the inner circumference side permanent magnets 11a and the outer circumference side permanent magnets 12a have a same pole arrangement).

Further, for example in a case where an execution instruction of field-weakening control output from an external control device or the like is detected, the actuator 15 rotates the first planetary carrier (C1) 36 around the rotary shaft O such that the state of the electric motor 10 changes toward a field-weakening state where the same magnetic poles of the inner circumference side permanent magnets 11a of the inner circumference side rotor 11 and the outer circumference side permanent magnets 12a of the outer circumference side rotor 12 are arranged to face each other (the inner circumference side permanent magnets 11a and the outer circumference side permanent magnets 12a have an opposite pole arrangement).

The electric motor 10 according to this embodiment has the above configuration. Next, a method of driving the electric motor 10 will be explained with reference to the accompanying drawings.

Figure 10:
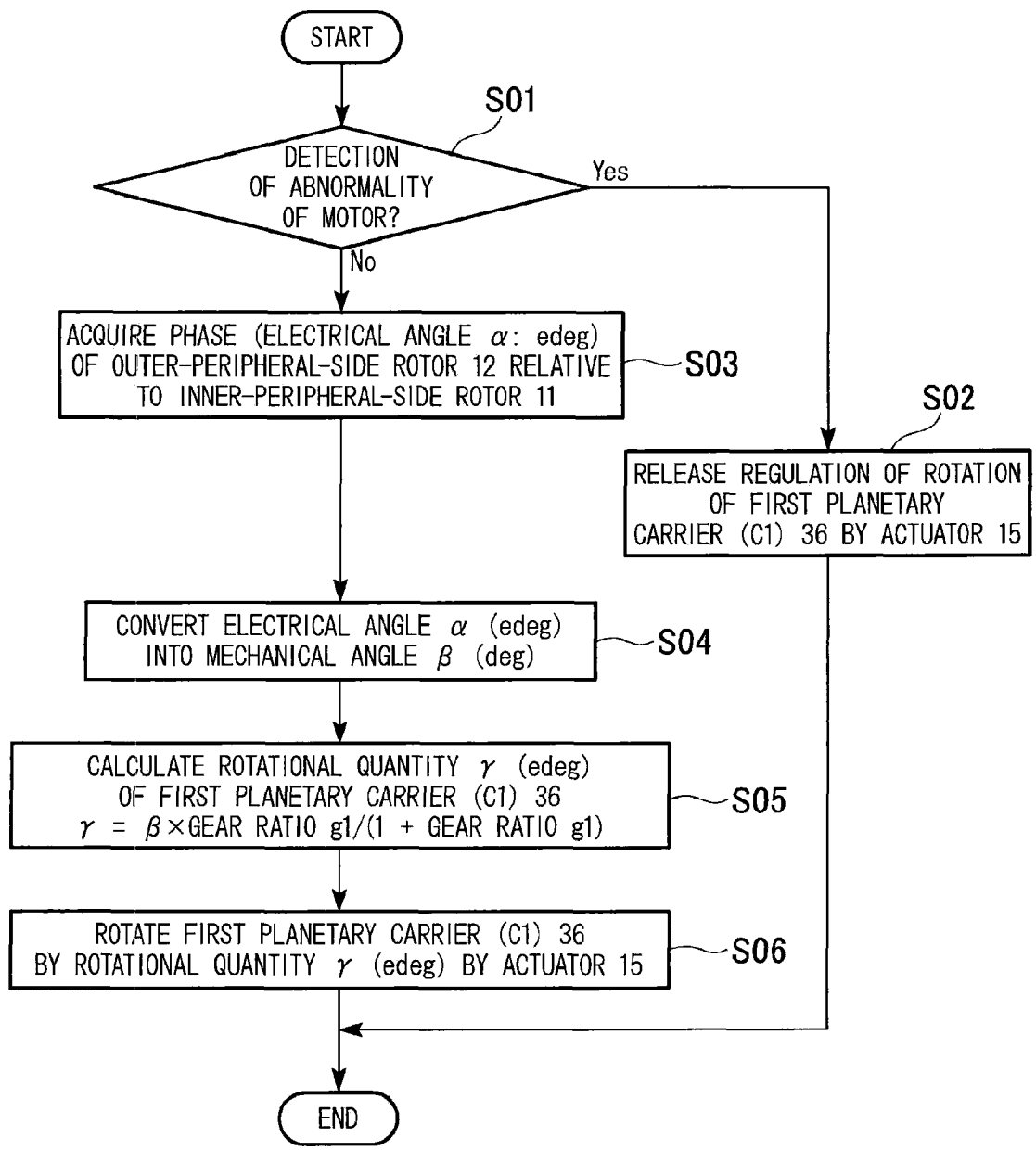
FIG. 10 is a flow chart showing a method of driving the electric motor according to the embodiment of the present invention.

First, in Step S01 shown in, for example, FIG. 10, it is determined whether or not the abnormality of the electric motor 10 has been detected. If this determination result is "NO", the process proceeds to Step S03 to be hereinafter described.

On the other hand, if this determination result is "YES", the process proceeds to Step S02.

Then, in Step S02, the regulation of the rotation of the first planetary carrier (C1) 36 by the actuator 15 is released, the free rotation of the first planetary carrier (C1) 36 around the rotary shaft O is allowed, and a series of processing is then completed.

Further, in Step S03, the relative phase between the inner circumference side rotor 11 and the outer circumference side rotor 12 that is detected by, for example, a rotation sensor or the like (electrical angle α: edeg) is acquired.

Next, in Step S04, the acquired electrical angle α is converted to a mechanical angle β ($=\alpha/p$) according to the number p of pole pairs of the electric motor 10.

Next, in Step S05, the rotational quantity γ ($=\beta \times g1/(1+g1)$) when the first planetary carrier (C1) 36 is rotated around the rotary shaft O is calculated according to the mechanical angle β and the gear ratio g1 of the sun gear (S) 35 to the first ring gear (R1) 31.

Then, in Step S06, the first planetary carrier (C1) 36 is rotated by the rotational quantity γ around the rotary shaft O by the actuator 15, and a series of processing is then completed.

As described above, according to the electric motor 10 according to this embodiment, first, the permanent magnets 11a and 12a having a substantially rectangular plate shape are arranged in the peripheral direction in the inner circumference side rotor 11 and the outer circumference side rotor 12, respectively, and the permanent magnets 11a and 12a are set so that their long sides may be arranged to face each other in the radial direction of the rotors 11 and 12 in a section in a direction parallel to the rotary shaft O. This can prevent the magnetic fluxes of the permanent magnets 11a and 12a from being emitted to their surrounding magnetic circuits (e.g., the rotor cores 21 and 22 or the like). Thereby, the generation of an iron loss can be suppressed, for example, the amount of interlinking magnetic fields that the field fluxes generated by the outer circumference side permanent magnets 12a of the outer circumference side rotor 12 interlink the stator windings 13a can be efficiently increased or reduced by the field fluxes generated by the inner circumference side permanent magnets 11a of the inner circumference side rotor 11. In the field-strengthening state, the torque constant (that is, torque/phase current) of the electric motor 10 can be set to a relatively high value. A maximum torque value output by the electric motor 10 can be increased without reducing the current loss during the operation of the electric motor 10 or without changing the maximum value of the output current of an inverter (not shown) that controls application of a current to the stator windings 13a.

Moreover, the plurality of first planetary gears 33a that constitute the first planetary gear train 33, and the plurality of second planetary gears 34a that constitute the second planetary gear train 34 mesh with the sun gear (S) 35 that is an idle gear while they are made rotatable around the planetary rotary shafts P1 and P2, respectively. Thereby, even in a state where the synchronized operation of the inner circumference side rotor 11 and the outer circumference side rotor 12 are executed, or in a stopped state of the electric motor 10, the relative phase between the inner circumference side rotor 11 and the outer circumference side rotor 12 can be easily changed.

Further, since any friction in the sun gear (S) 35 can be reduced, the force required for the regulation or driving of the rotation of the first planetary carrier (C1) 36 around the rotary shaft O (that is, holding in a predetermined rotational position) just have to be, for example, larger than the attractive force or repulsive force between the inner circumference side permanent magnets 11a of the inner circumference side rotor 11 and the outer circumference side permanent magnets 12a of the outer circumference side rotor 12, irrespective of the rotational frequency of the electric motor 10, or the intensity of a torque. For example, phases can be efficiently controlled without requiring a larger force than the torque output by the electric motor 10 like a brake actuator.

Moreover, the actuator 15 can rotate the first planetary carrier (C1) 36 without requiring the supply of electric power from the outside, and can prevent the operating efficiency of the electric motor 10 from being reduced.

Further, as the predetermined rotational quantity when the first planetary carrier (C1) 36 that supports the first planetary gear train 33 rotates around the rotary shaft O is set to at least a mechanical angle $\theta(°)=(180/p) \times g/(1+g1)$, the state of the electric motor 10 can be properly switched between a field-strengthening state where different magnetic poles of the inner circumference side permanent magnets 11a of the inner circumference side rotor 11 and the outer circumference side permanent magnets 12a of the outer circumference side rotor 12 are arranged to face each other (that is, the inner circumference side permanent magnets 11a of the inner circumference side rotor 11 and the outer circumference side permanent magnets 12a of the outer circumference side rotor 12 have a same pole arrangement), and a field-weakening state where the same magnetic poles of the inner circumference side permanent magnets 11a of the inner circumference side rotor 11 and the outer circumference side permanent magnets 12a of the outer circumference side rotor 12 are arranged to face each other (that is, the inner circumference side permanent magnets 11a of the inner circumference side rotor 11 and the outer circumference side permanent magnets 12a of the outer circumference side rotor 12) have an opposite pole arrangement).

Moreover, the intensity of the field fluxes that interlink the stator windings 13a can be continuously changed, and the induced voltage constant Ke of the electric motor 10 can be continuously changed to a proper value. Thereby, the values of the operational rotational frequency and torque of the electric motor 10 can be continuously changed, and the ranges of the operational rotational frequency and torque can be expanded. Therefore, the maximum value of the operating efficiency of the electric motor 10 can be increased, and an efficient region where the operating efficiency becomes a predetermined efficiency or more can be expanded.

Further, for example in a case where an execution instruction of field-weakening control outputs from an external control device or the like according to state quantities, such as a rotational frequency of the electric motor 10, and a power supply voltage, the first planetary carrier (C1) 36 is rotated around the rotary shaft O such that the state of the electric motor 10 changes toward a field-weakening state where the same magnetic poles of the inner circumference side permanent magnets 11a of the inner circumference side rotor 11 and the outer circumference side permanent magnets 12a of the outer circumference side rotor 12 are arranged to face each other. Therefore, it is possible to prevent, for example, high-voltage devices, such as an inverter that controls application of a current to the stator windings 13a from being brought into an over-voltage state.

Further, by providing the recesses 22a extending parallel to the rotary shaft O, on the outer peripheral surface 22A of the outer circumference side rotor core 22 between the outer circumference side magnet mounting portions 24 that are adjacent to each other in the peripheral direction in the outer circumference side rotor 12, it is possible to suppress the occurrence of short-circuiting of magnetic paths between the magnetic poles of the inner circumference side permanent magnets 11a of the inner circumference side rotor 11 and the outer circumference side permanent magnets 12a of the outer circumference side rotor 12 that are not in a mutually facing arrangement relationship.

Figure 11:
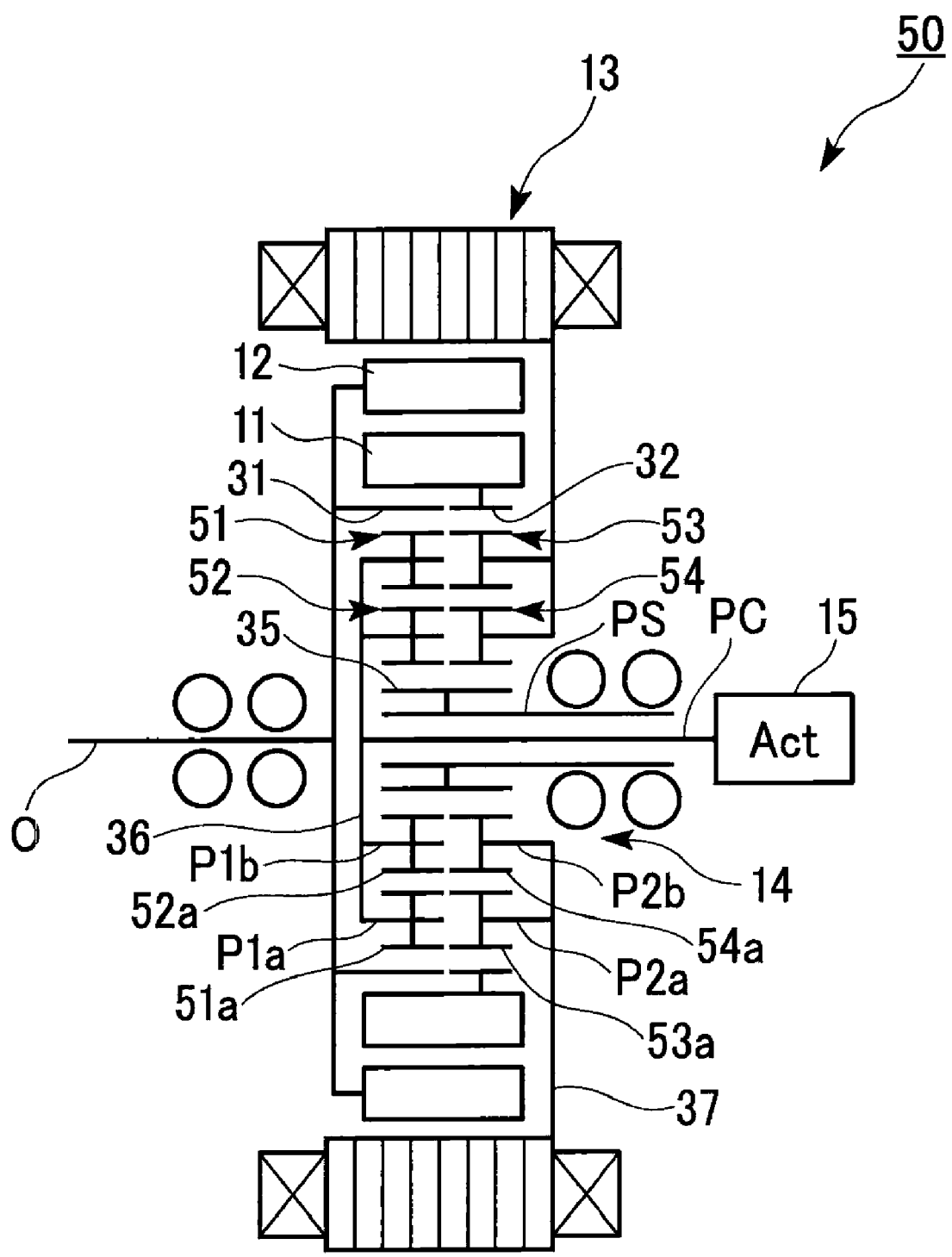
FIG. 11 is a view schematically showing the configuration of an electric motor according to a first modified example of the embodiment of the present invention.

In addition, in the above-mentioned embodiment, the planetary gear mechanism 14 is a single-pinion-type planetary gear mechanism. However, the invention is not limited thereto. For example, like an electric motor 50 according to a first modified example of the above-described embodiment shown in FIG. 11, the planetary gear mechanism 14 may be a double-pinion-type planetary gear mechanism.

The electric motor 50 according to the first modified example is different from the electric motor 10 according to the above-described embodiment in that the two-row first planetary gear trains 51 and 52 that mesh with each other are arranged between the first ring gear (R1) 31 and the sun gear (S) 35, and the two-row second planetary gear trains 53 and 54 that mesh with each other are arranged between the second ring gear (R2) 32 and the sun gear (S) 35.

That is, one first planetary gear train 51 of the two-row first planetary gear trains 51 and 52 that mesh with each other meshes with the first ring gear (R1) 31, and the other first planetary gear train 52 meshes with the sun gear (S) 35.

Further, one second planetary gear train 53 of the two-row second planetary gear trains 53 and 54 that mesh with each other meshes with the second ring gear (R1) 32, and the other second planetary gear train 54 meshes with the sun gear (S) 35.

Also, the first planetary carrier (C1) 36 rotatably supports a plurality of first planetary gears 51a that constitute one first planetary gear train 51 around a first planetary rotary shaft P1a, and rotatably supports a plurality of first planetary gears 52a that constitute the other first planetary gear train 52 around a first planetary rotary shaft P1b, and is made rotatable round the rotary shaft O.

Further, the second planetary carrier (C2) 37 rotatably supports a plurality of second planetary gears 53a that constitute one second planetary gear train 53 around a second planetary rotary shaft P2a, and rotatably supports a plurality of second planetary gears 54a that constitute the other second planetary gear train 54 around a second planetary rotary shaft P2b, and is fixed to the stator 13.

Also, each of the planetary gears 51a, 52a, 53a, and 54a has substantially the same gear shape.

Figure 12:
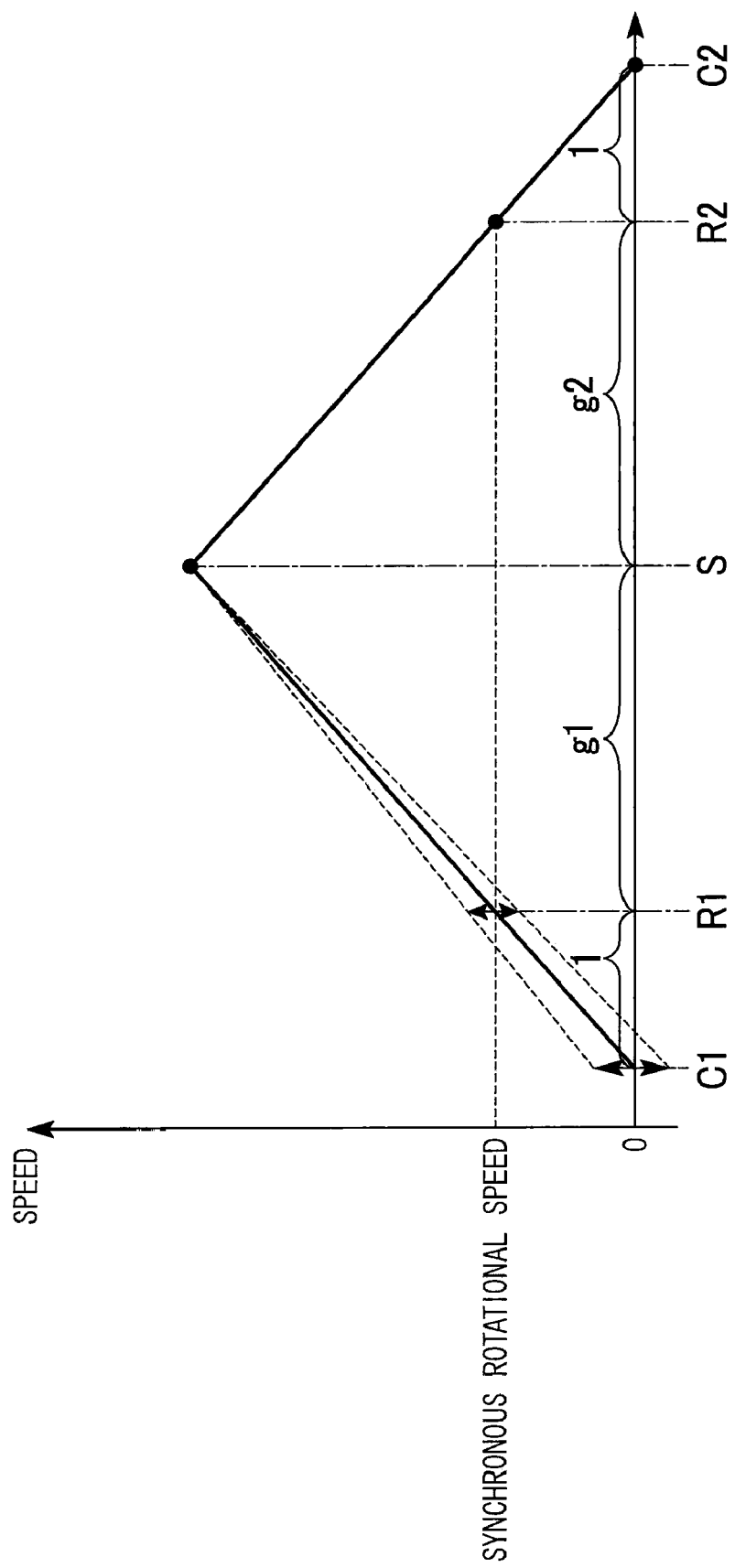
FIG. 12 is a velocity diagram of a planetary gear mechanism according to the first modified example of the embodiment of the present invention.

In the electric motor 50 according to the first modified example, the two-row first planetary gear trains 51 and 52 and the two-row second planetary gear trains 53 and 54 are provided. Thereby, the sun gear (S) 35, the inner circumference side rotor 11, and the outer circumference side rotor 12 rotates in the same direction such as the rotational state of the sun gear (S) 35 shown in FIG. 12.

With the electric motor 50 according to the first modified example, the rotational directions of the inner circumference side rotor 11, the outer circumference side rotor 12, and the sun gear (S) 35 can be set to a same direction. In addition, in a case where the electric motor 10 is mounted to a vehicle as a driving source, for example, it is possible to prevent a power transmission mechanism, such as a transmission, from being complicated even in a case where an output shaft of the electric motor 10 is connected to the sun gear (S) 35 in addition to the inner circumference side rotor 11 or the outer circumference side rotor 12.

Moreover, since the rotational quantity of the outer circumference side rotor 12 gets smaller compared with the rotational quantity of the first planetary carrier (C1) 36, the resolution when the rotational quantity of the outer circumference side rotor 12 is controlled can be improved.

In addition, in the above-described embodiment, the first planetary carrier (C1) 36 is made rotatable around the rotary shaft O, and the second planetary carrier (C2) 37 is fixed to the stator 13. However, the invention is not limited thereto. For example, the second planetary carrier (C2) 37 may be made rotatable around the rotary shaft O, and the first planetary carrier (C1) 36 may be fixed to the stator 13.

In addition, in the above-described embodiment, the actuator 15 includes the hydraulic pump 15a. However, the invention is not limited thereto. For example the actuator may include an electric motor or the like.

Hereinafter, the inner circumference side rotor 11 and the outer circumference side rotor 12 of the electric motor 10 according to a second modified example of the above-described embodiment will be explained.

Figure 13:
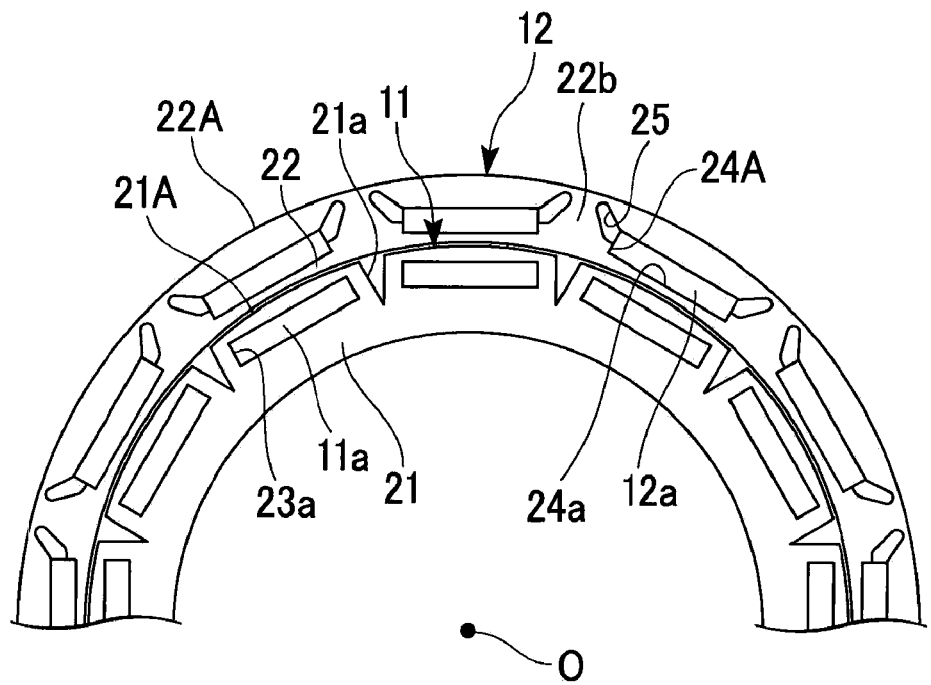
FIG. 13 is a cross-sectional view showing the upper half of an inner circumference side rotor and an outer circumference side rotor of an electric motor according to a second modified example of the embodiment of the present invention.

As shown in, for example, FIG. 13, in the second modified example, each of the inner circumference side permanent magnets 11a is buried in the inner circumference side rotor core 21 of the inner circumference side rotor 11, and each of the outer circumference side permanent magnets 12a is buried in the outer circumference side rotor core 22 of the outer circumference side rotor 12. In the inner circumference side rotor 11, a plurality of recesses 21a that extend parallel to the rotary shaft O on the outer peripheral surface 21A of the inner circumference side rotor core 21 are provided at predetermined intervals in the peripheral direction. Moreover, a single magnet mounting hole 23a that passes through the inner circumference side rotor core 21 parallel to the rotary shaft O is provided in a position radially shifted to the outer circumference side between the recesses 21a that are adjacent to each other in the peripheral direction, and each magnet mounting hole 23a is mounted with a substantially rectangular plate-like inner circumference side permanent magnet 11a.

Moreover, in the outer circumference side rotor 12, a plurality of magnet mounting holes 24a that pass through the outer circumference side rotor core 22 parallel to the rotary shaft O are provided in positions that are spaced at predetermined intervals in the peripheral direction and radially shifted to the inner circumference side, and each of the magnet mounting holes 24a is mounted with a substantially rectangular plate-like outer circumference side permanent magnet 12a. Further, between the magnet mounting holes 24a that are adjacent to each other in the peripheral direction, magnetic flux barrier holes 25 that are opened on a peripheral inner wall 24A between the magnet mounting holes 24a, extend toward the outer peripheral surface 22A of the outer circumference side rotor core 22 so as to gradually approach each other, and pass through the outer circumference side rotor core 22 parallel to the rotary shaft O are provided in the outer circumference side rotor core 22. Thereby, a core portion 22b that is sandwiched on both sides in the peripheral direction by the magnetic flux barrier holes 25 having a relatively small magnetic permeability is formed between the outer circumference side permanent magnets 12a that are adjacent to each other in the peripheral direction in the outer circumference side rotor core 22.

Also, when the relative phase between the inner circumference side rotor 11 and the outer circumference side rotor 12 is changed by the planetary gear mechanism 14, the long sides of the inner circumference side permanent magnets 11a and the long sides of the outer circumference side permanent magnets 12a may be set so as to radially face each other in a cross section perpendicular to the rotary shaft O.

With the electric motor 10 according to the second modified example, the long sides of the inner circumference side permanent magnets 11a and the long sides of the outer circumference side permanent magnets 12a are arranged to face each other when the relative phase between the inner circumference side rotor 11 and the outer circumference side rotor 12 is changed by the planetary gear mechanism 14, and a setting is made so that the distance between the inner circumference side permanent magnets 11a and the outer circumference side permanent magnets 12a may become relatively short. Thereby, for example, the amount of interlinking magnetic fluxes that interlink with the stator windings 13a, out of the field fluxes generated by the outer circumference side permanent magnets 12a can be efficiently increased or reduced by the field fluxes generated by the inner circumference side permanent magnets 11a. Also, for example, in the field-strengthening state, the torque constant (i.e., torque/phase current) of the electric motor 10 can be set to a relatively high value. A maximum torque value output by the electric motor 10 can be increased, and the maximum value of the operating efficiency of the electric motor 10 can be increased, without reducing the current loss during the operation of the electric motor 10 and without changing the maximum value of the output current of an inverter that controls the application of a current to the stator windings.

Moreover, the recess 21a having a relatively small magnetic permeability is provided between the inner circumference side permanent magnets 11a that are adjacent to each other in the peripheral direction in the inner circumference side rotor core 21. Thereby, it is possible to suppress the occurrence of short-circuiting of the magnetic paths between the magnetic poles (e.g., between the magnetic poles of the inner circumference side permanent magnets 11a and the outer circumference side permanent magnets 12a that are arranged so as to bridge over the recess 21a or the like) of the inner circumference side permanent magnets 11a and the outer circumference side permanent magnets 12a that are not in a mutually facing arrangement relationship.

In addition, the core portion 22b that is sandwiched on both sides in the peripheral direction by the magnetic flux barrier holes 25 having a relatively small magnetic permeability is provided between the outer circumference side permanent magnets 12a that are adjacent to each other in the peripheral direction in the outer circumference side rotor core 22. Thereby, each of the rotors 11 and 12 can be efficiently rotated by using both a magnet torque resulting from the attractive force or a repulsive force generated between the rotating magnetic field of the stator windings and each of the permanent magnets 11a and 12a, and a rotating torque, i.e., a reluctance torque, resulting from the attractive force generated between the rotating magnetic field and the core portion 22b.

Hereinafter, the inner circumference side rotor 11 and the outer circumference side rotor 12 of the electric motor 10 according to a third modified example of the above-described embodiment will be explained.

Figure 14:
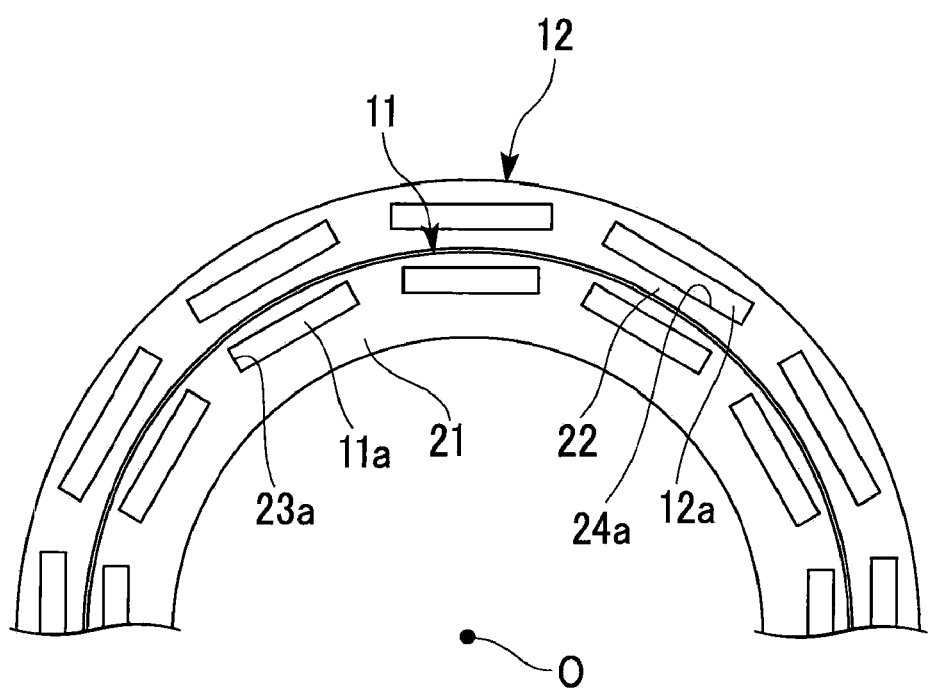
FIG. 14 is a cross-sectional view showing the upper half of an inner circumference side rotor and an outer circumference side rotor of an electric motor according to a third modified example of the embodiment of the present invention.

As shown in, for example, FIG. 14, in the third modified example, each of the inner circumference side permanent magnets 11a is buried in the inner circumference side rotor core 21 of the inner circumference side rotor 11, and each of the outer circumference side permanent magnets 12a is buried in the outer circumference side rotor core 22 of the outer circumference side rotor 12.

Here, a plurality of magnet mounting holes 23a that pass through the inner circumference side rotor core 21 parallel to the rotary shaft O are provided in positions that are spaced at predetermined intervals in the peripheral direction and radially shifted to the outer circumference side, and each of the magnet mounting holes 23a is mounted with a substantially rectangular plate-like inner circumference side permanent magnet 11a. Moreover, a plurality of magnet mounting holes 24a that pass through the outer circumference side rotor core 22 parallel to the rotary shaft O are provided in positions that are spaced at predetermined intervals in the peripheral direction and radially shifted to the inner circumference side, and each of the magnet mounting holes 24a is mounted with a substantially rectangular plate-like outer circumference side permanent magnet 12a.

Also, when the relative phase between the inner circumference side rotor 11 and the outer circumference side rotor 12 is changed by the planetary gear mechanism 14, the long sides of the inner circumference side permanent magnets 11a and the long sides of the outer circumference side permanent magnets 12a may be set so as to radially face each other in a section in a direction parallel to the rotary shaft O.

With the electric motor 10 according to the third modified example, the coercive force of the outer circumference side permanent magnets 12a by the outer circumference side rotor 12 and the coercive force of the inner circumference side permanent magnets 11a by the inner circumference side rotor 11 can be improved.

Hereinafter, the inner circumference side rotor 11 and the outer circumference side rotor 12 of the electric motor 10 according to a fourth modified example of the above-described embodiment will be explained.

Figure 15:
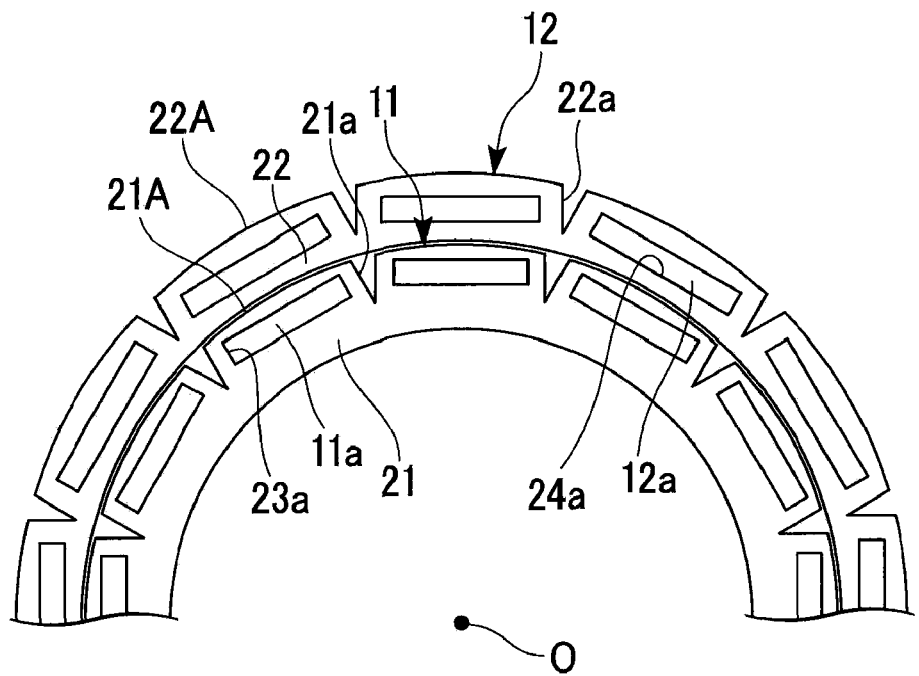
FIG. 15 is a cross-sectional view showing the upper half of an inner circumference side rotor and an outer circumference side rotor of an electric motor according to a fourth modified example of the embodiment of the present invention.

As shown in, for example, FIG. 15, in the fourth modified example, each of the inner circumference side permanent magnets 11a is buried in the inner circumference side rotor core 21 of the inner circumference side rotor 11, and each of the outer circumference side permanent magnets 12a is buried in the outer circumference side rotor core 22 of the outer circumference side rotor 12.

Here, in the inner circumference side rotor 11, a plurality of recesses 21a that extend parallel to the rotary shaft O on the outer peripheral surface 21A of the inner circumference side rotor core 21 are provided at predetermined intervals in the peripheral direction. Moreover, a single magnet mounting hole 23a that passes through the inner circumference side rotor core 21 parallel to the rotary shaft O is provided in a position radially shifted to the outer circumference side between the recesses 21a that are adjacent to each other in the peripheral direction, and each magnet mounting hole 23a is mounted with a substantially rectangular plate-like inner circumference side permanent magnet 11a.

Here, in the outer circumference side rotor 12, a plurality of recesses 22a that extend parallel to the rotary shaft O on the outer peripheral surface 22A of the outer circumference side rotor core 22 are provided at predetermined intervals in the peripheral direction. Moreover, a single magnet mounting hole 24a that passes through the outer circumference side rotor core 22 parallel to the rotary shaft O is provided in a position radially shifted to the inner circumference side between the recesses 22a that are adjacent to each other in the peripheral direction, and each magnet mounting hole 24a is mounted with a substantially rectangular plate-like outer circumference side permanent magnet 12a.

Also, when the relative phase between the inner circumference side rotor 11 and the outer circumference side rotor 12 is changed by the planetary gear mechanism 14, the long sides of the inner circumference side permanent magnets 11a and the long sides of the outer circumference side permanent magnets 12a may be set so as to radially face each other in a section in a direction parallel to the rotary shaft O.

Hereinafter, the inner circumference side rotor 11 and the outer circumference side rotor 12 of the electric motor 10 according to a fifth modified example of the above-described embodiment will be explained.

Figure 16:
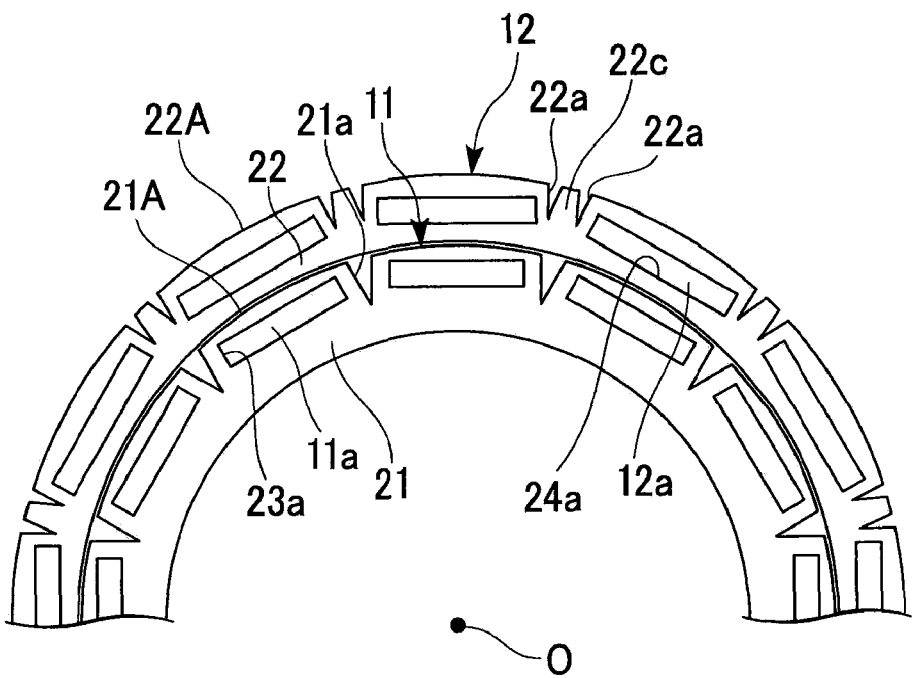
FIG. 16 is a cross-sectional view showing the upper half of an inner circumference side rotor and an outer circumference side rotor of an electric motor according to a fifth modified example of the embodiment of the present invention.

As shown in, for example, FIG. 16, in the fifth modified example, each of the inner circumference side permanent magnets 11a is buried in the inner circumference side rotor core 21 of the inner circumference side rotor 11, and each of the outer circumference side permanent magnets 12a is buried in the outer circumference side rotor core 22 of the outer circumference side rotor 12.

Here, in the inner circumference side rotor 11, a plurality of recesses 21a that extend parallel to the rotary shaft O on the outer peripheral surface 21A of the inner circumference side rotor core 21 are provided at predetermined intervals in the peripheral direction. Moreover, a single magnet mounting hole 23a that passes through the inner circumference side rotor core 21 parallel to the rotary shaft O is provided in a position radially shifted to the outer circumference side between the recesses 21a that are adjacent to each other in the peripheral direction, and each magnet mounting hole 23a is mounted with a substantially rectangular plate-like inner circumference side permanent magnet 11a.

Moreover, in the outer circumference side rotor 12, a plurality of pairs of recesses 22a that extend parallel to the rotary shaft O on the outer peripheral surface 22A of the outer circumference side rotor core 22 are provided at predetermined intervals in the peripheral direction. Moreover, a single magnet mounting hole 24a that passes through the outer circumference side rotor core 22 parallel to the rotary shaft O is provided in a position radially shifted to the inner circumference side between the two pairs of recesses 22a that are adjacent to each other in the peripheral direction, and each magnet mounting hole 24a is mounted with a substantially rectangular plate-like outer circumference side permanent magnet 12a. Between the recesses 22a that make a pair in the outer circumference side rotor core 22, a salient pole portion 22c that is sandwiched on both sides in the peripheral direction by the recesses 22a having a relatively small magnetic permeability is formed.

Also, when the relative phase between the inner circumference side rotor 11 and the outer circumference side rotor 12 is changed by the planetary gear mechanism 14, the long sides of the inner circumference side permanent magnets 11a and the long sides of the outer circumference side permanent magnets 12a may be set so as to radially face each other in a section in a direction parallel to the rotary shaft O.

With the electric motor 10 according to the fifth modified example, the coercive force of the outer circumference side permanent magnets 12a by the outer circumference side rotor 12 and the coercive force of the inner circumference side permanent magnets 11a by the inner circumference side rotor 11 can be improved. Moreover, the occurrence of short-circuiting of the magnetic paths between the magnetic poles of the inner circumference side permanent magnets 11a and the outer circumference side permanent magnets 12a that are not in a mutually facing arrangement relationship can be suppressed by the recesses 21a, and each of the rotors 11 and 12 can be efficiently rotated by using both a magnet torque resulting from the attractive force or the repulsive force generated between the rotating magnetic field of the stator windings and each of the permanent magnets 11a and 12a, and a rotating torque, i.e., a reluctance torque, resulting from the attractive force generated between the rotating magnetic field and the salient pole portion 22c.

Hereinafter, the inner circumference side rotor 11 and the outer circumference side rotor 12 of the electric motor 10 according to a sixth modified example of the above-described embodiment will be explained.

Figure 17:
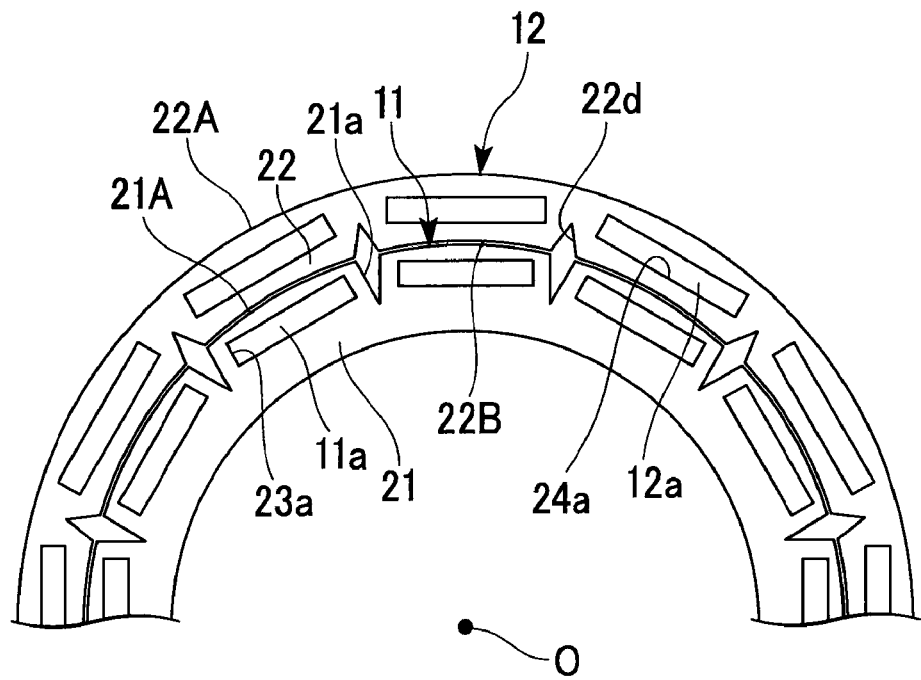
FIG. 17 is a cross-sectional view showing the upper half of an inner circumference side rotor and an outer circumference side rotor of an electric motor according to a sixth modified example of the embodiment of the present invention.

As shown in, for example, FIG. 17, in the sixth modified example, each of the inner circumference side permanent magnets 11a is buried in the inner circumference side rotor core 21 of the inner circumference side rotor 11, and each of the outer circumference side permanent magnets 12a is buried in the outer circumference side rotor core 22 of the outer circumference side rotor 12.

Here, in the inner circumference side rotor 11, a plurality of recesses 21a that extend parallel to the rotary shaft O on the outer peripheral surface 21A of the inner circumference side rotor core 21 are provided at predetermined intervals in the peripheral direction. Moreover, a single magnet mounting hole 23a that passes through the inner circumference side rotor core 21 parallel to the rotary shaft O is provided in a position radially shifted to the outer circumference side between the recesses 21a that are adjacent to each other in the peripheral direction, and each magnet mounting hole 23a is mounted with a substantially rectangular plate-like inner circumference side permanent magnet 11a.

Further, in the outer circumference side rotor 12, a plurality of recesses 22d that extend parallel to the rotary shaft O on an outer peripheral surface 22B of the outer circumference side rotor core 22 are provided at predetermined intervals in the peripheral direction. Moreover, a single magnet mounting hole 24a that passes through the outer circumference side rotor core 22 parallel to the rotary shaft O is provided in a position radially shifted to the inner circumference side between the recesses 22d that are adjacent to each other in the peripheral direction, and each magnet mounting hole 24a is mounted with a substantially rectangular plate-like outer circumference side permanent magnet 12a.

Also, when the relative phase between the inner circumference side rotor 11 and the outer circumference side rotor 12 is changed by the planetary gear mechanism 14, in a cross section perpendicular to the rotary shaft O, the long sides of the inner circumference side permanent magnets 11a and the long sides of the outer circumference side permanent magnets 12a may be set so as to radially face each other, and the recesses 21a of the inner circumference side rotor 11, and the recesses 22d of the outer circumference side rotor 12 may be set so as to radially face each other.

With the electric motor 10 according to a sixth modified example, for example, when the relative phase between the inner circumference side rotor 11 and the outer circumference side rotor 12 is changed by the planetary gear mechanism 14, the recesses 21a and the recesses 22d are arranged so as to face each other, and thereby, spatial portions formed by the recesses 21a and 21d are arranged so as to face each other. As a result, it is possible to suppress the occurrence of short-circuiting of the magnetic paths between the magnetic poles of the inner circumference side permanent magnets 11a and the outer circumference side permanent magnets 12a that are not in a mutually facing arrangement relationship.

Hereinafter, the inner circumference side rotor 11 and the outer circumference side rotor 12 of the electric motor 10 according to a seventh modified example of the above-described embodiment will be explained.

Figure 18:
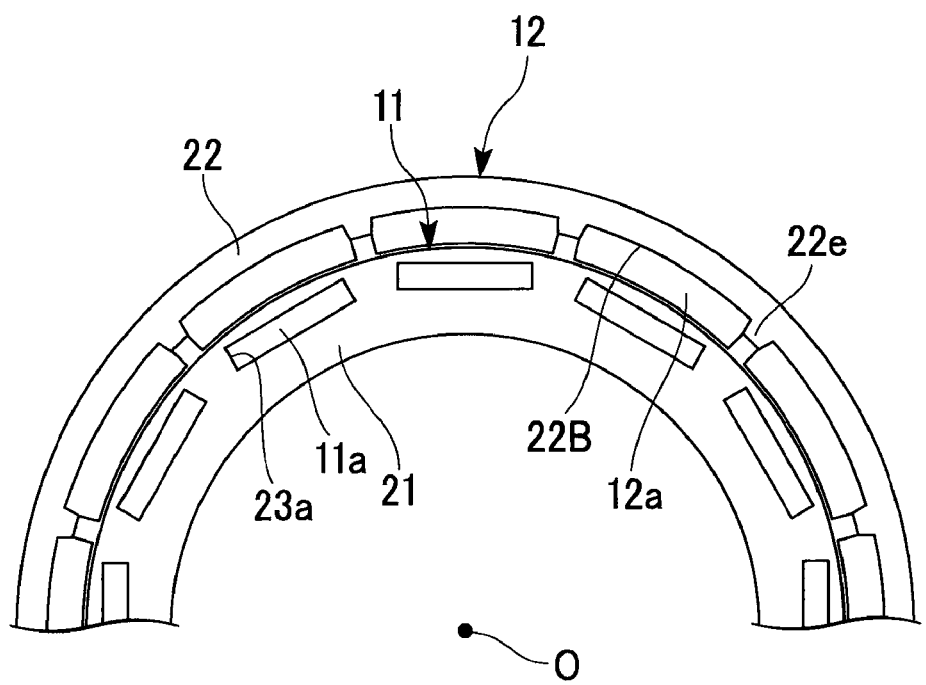
FIG. 18 is a cross-sectional view showing the upper half of an inner circumference side rotor and an outer circumference side rotor of an electric motor according to a seventh modified example of the embodiment of the present invention.

As shown in, for example, FIG. 18, in the seventh modified example, each of the inner circumference side permanent magnets 11a is buried in the inner circumference side rotor core 21 of the inner circumference side rotor 11, and each of the outer circumference side permanent magnets 12a is arranged on the inner peripheral surface 22B of the outer circumference side rotor core 22 of the outer circumference side rotor 12.

Here, a plurality of magnet mounting holes 23a that pass through the inner circumference side rotor core 21 parallel to the rotary shaft O are provided in positions that are spaced at predetermined intervals in the peripheral direction and radially shifted to the outer circumference side, and each of the magnet mounting holes 23a is mounted with a substantially rectangular plate-like inner circumference side permanent magnet 11a.

Further, in the outer circumference side rotor 12, a plurality of ribs 22e that extend parallel to the rotary shaft O on an outer peripheral surface 22B of the outer circumference side rotor core 22 are provided at predetermined intervals in the peripheral direction. Also, a substantially rectangular plate-like outer circumference side permanent magnet 12a is mounted on the inner peripheral surface 22B of the outer circumference side rotor core 22 so as to be sandwiched on both sides in the peripheral direction between the ribs 22e that are adjacent to each other in the peripheral direction.

Also, when the relative phase between the inner circumference side rotor 11 and the outer circumference side rotor 12 is changed by the planetary gear mechanism 14, the long sides of the inner circumference side permanent magnets 11a and the long sides of the outer circumference side permanent magnets 12a may be set so as to radially face each other in a cross section perpendicular to the rotary shaft O.

With the electric motor 10 according to the seventh modified example, the coercive force of the inner circumference side permanent magnets 11a by the inner circumference side rotor 11 can be improved, and the shape of the outer circumference side rotor 12 can be simplified.

Hereinafter, the inner circumference side rotor 11 and the outer circumference side rotor 12 of the electric motor 10 according to an eighth modified example of the above-described embodiment will be explained.

Figure 19:
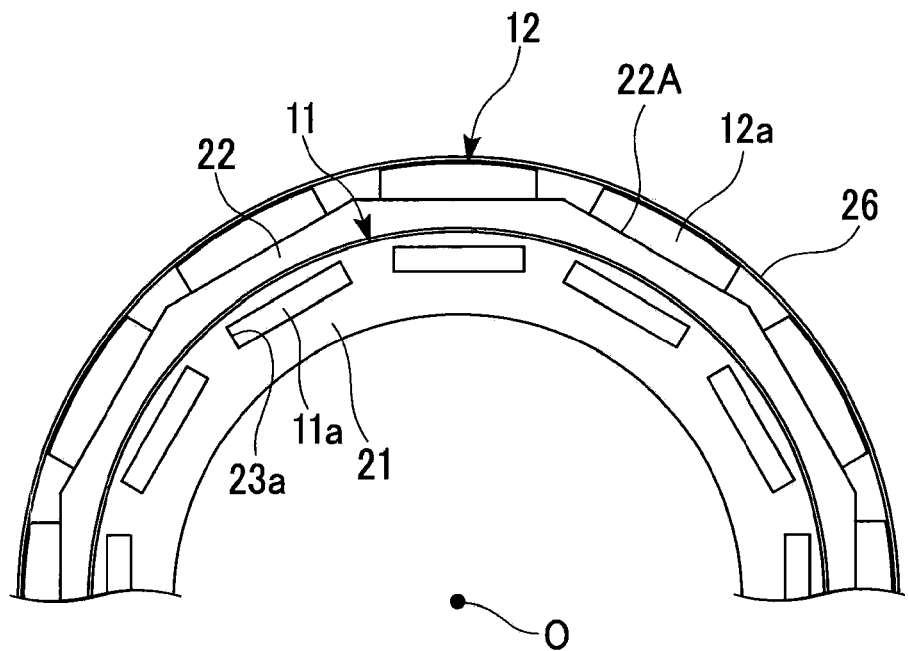
FIG. 19 is a cross-sectional view showing the upper half of an inner circumference side rotor and an outer circumference side rotor of an electric motor according to an eighth modified example of the embodiment of the present invention.

As shown in, for example, FIG. 19, in the eighth modified example, each of the inner circumference side permanent magnets 11a is buried in the inner circumference side rotor core 21 of the inner circumference side rotor 11, and each of the outer circumference side permanent magnets 12a is arranged on the inner peripheral surface 22A of the outer circumference side rotor core 22 of the outer circumference side rotor 12.

Here, a plurality of magnet mounting holes 23a that pass through the inner circumference side rotor core 21 parallel to the rotary shaft O are provided in positions that are spaced at predetermined intervals in the peripheral direction and radially shifted to the outer circumference side, and each of the magnet mounting holes 23a is mounted with a substantially rectangular plate-like inner circumference side permanent magnet 11a.

Further, in the outer circumference side rotor 12, a plurality of substantially rectangular plate-like outer circumference side permanent magnets 12a are arranged at predetermined intervals in the peripheral direction on the outer peripheral surface 22A of the outer circumference side rotor core 22, and a substantially cylindrical outer circumference side holding member 26 that abuts on an outer peripheral surface of each of the outer circumference side permanent magnets 12a is provided. Also, each of the outer circumference side permanent magnets 12a is fixed so as to be sandwiched between the outer peripheral surface 22A of the outer circumference side rotor core 22 and an inner peripheral surface of the outer circumference side holding member 26.

Also, when the relative phase between the inner circumference side rotor 11 and the outer circumference side rotor 12 is changed by the planetary gear mechanism 14, the long sides of the inner circumference side permanent magnets 11a and the long sides of the outer circumference side permanent magnets 12a may be set so as to radially face each other in a section in a direction parallel to the rotary shaft O.

With the electric motor 10 according to the eighth modified example, the coercive force of the inner circumference side permanent magnets 11a by the inner circumference side rotor 11 can be improved, and the shape of the outer circumference side rotor 12 can be simplified.

Hereinafter, the inner circumference side rotor 11 and the outer circumference side rotor 12 of the electric motor 10 according to a ninth modified example of the above-described embodiment will be explained.

Figure 20:
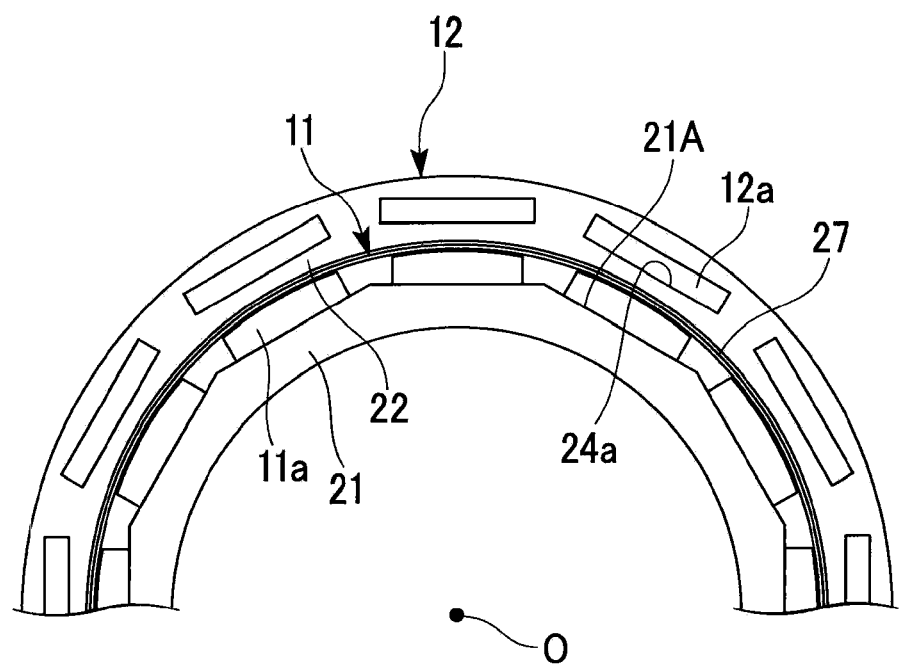
FIG. 20 is a cross-sectional view showing the upper half of an inner circumference side rotor and an outer circumference side rotor of an electric motor according to a ninth modified example of the embodiment of the present invention.

As shown in, for example, FIG. 20, in the ninth modified example, each of the inner circumference side permanent magnets 11a is arranged on the outer peripheral surface 21A of the inner circumference side rotor core 21 of the inner circumference side rotor 11, and each of the outer circumference side permanent magnets 12a is buried in the outer circumference side rotor core 22 of the outer circumference side rotor 12.

Here, in the inner circumference side rotor 11, a plurality of substantially rectangular plate-like inner circumference side permanent magnets 11a are arranged at predetermined intervals in the peripheral direction on the outer peripheral surface 21A of the inner circumference side rotor core 21, and a substantially cylindrical inner circumference side holding member 27 that abuts on an outer peripheral surface of each of the inner circumference side permanent magnets 11a is provided. Also, each of the inner circumference side permanent magnets 11a is fixed so as to be sandwiched between the outer peripheral surface 21A of the inner circumference side rotor core 21 and an inner peripheral surface of the inner circumference side holding member 27.

Moreover, a plurality of magnet mounting holes 24a that pass through the outer circumference side rotor core 22 parallel to the rotary shaft O are provided in positions that are spaced at predetermined intervals in the peripheral direction and radially shifted to the outer circumference side, and each of the magnet mounting holes 24a is mounted with a substantially rectangular plate-like outer circumference side permanent magnet 12a.

Also, when the relative phase between the inner circumference side rotor 11 and the outer circumference side rotor 12 is changed by the planetary gear mechanism 14, the long sides of the inner circumference side permanent magnets 11a and the long sides of the outer circumference side permanent magnets 12a may be set so as to radially face each other in a cross section perpendicular to the rotary shaft O.

With the electric motor 10 according to the ninth modified example, the coercive force of the outer circumference side permanent magnets 12a by the outer circumference side rotor 12 can be improved. Also, the distance between the inner circumference side permanent magnets 11a and the outer circumference side permanent magnets 12a can be shortened while the shape of the inner circumference side rotor 11 can be simplified, thereby efficiently increasing or decreasing the field fluxes by the permanent magnets 11a and 12a that interlink stator windings. Further, by forming a spatial portion having a relatively small magnetic permeability between the inner circumference side permanent magnets 11a that are adjacent to each other in the peripheral direction, it is possible to suppress the occurrence of short-circuiting of the magnetic paths between the magnetic poles of the inner circumference side permanent magnets 11a and the outer circumference side permanent magnets 12a that are not in a mutually facing arrangement relationship.

Hereinafter, the inner circumference side rotor 11 and the outer circumference side rotor 12 of the electric motor 10 according to a tenth modified example of the above-described embodiment will be explained.

Figure 21:
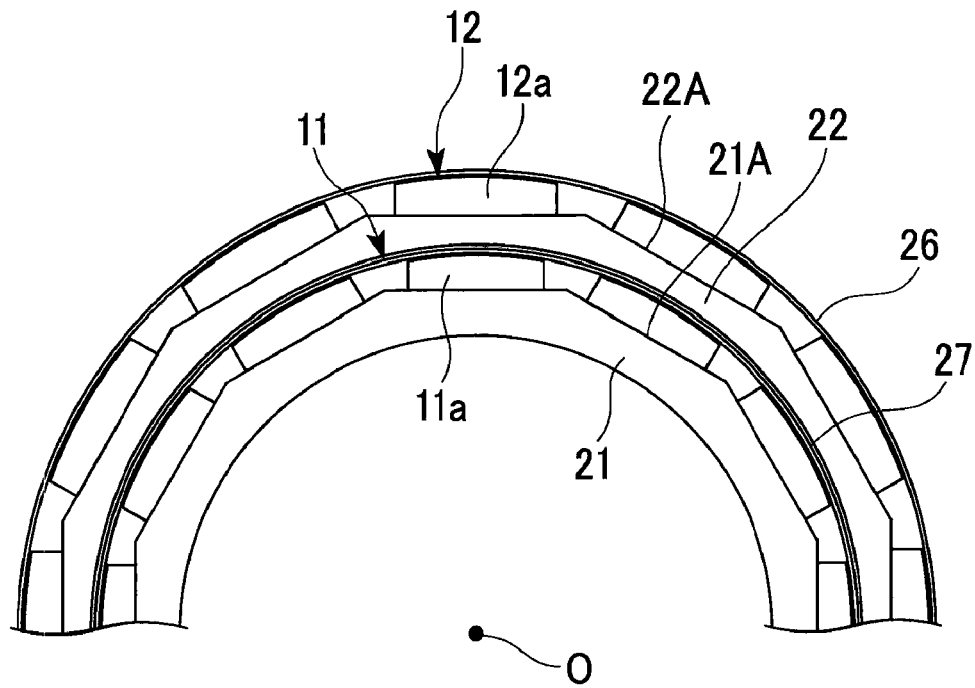
FIG. 21 is a cross-sectional view showing the upper half of an inner circumference side rotor and an outer circumference side rotor of an electric motor according to a tenth modified example of the embodiment of the present invention.

As shown in, for example, FIG. 21, in the tenth modified example, each of the inner circumference side permanent magnets 11a is arranged on the outer peripheral surface 21A of the inner circumference side rotor core 21 of the inner circumference side rotor 11, and each of the outer circumference side permanent magnets 12a is arranged on the outer peripheral surface 22A of the outer circumference side rotor core 22 of the outer circumference side rotor 12.

Here, in the inner circumference side rotor 11, a plurality of substantially rectangular plate-like inner circumference side permanent magnets 11a are arranged at predetermined intervals in the peripheral direction on the outer peripheral surface 21A of the inner circumference side rotor core 21, and a substantially cylindrical inner circumference side holding member 27 that abuts on an outer peripheral surface of each of the inner circumference side permanent magnets 11a is provided. Also, each of the inner circumference side permanent magnets 11a is fixed so as to be sandwiched between the outer peripheral surface 21A of the inner circumference side rotor core 21 and an inner peripheral surface of the inner circumference side holding member 27.

Further, in the outer circumference side rotor 12, a plurality of substantially rectangular plate-like outer circumference side permanent magnets 12a are arranged at predetermined intervals in the peripheral direction on the outer peripheral surface 22A of the outer circumference side rotor core 22, and a substantially cylindrical outer circumference side holding member 26 that abuts on an outer peripheral surface of each of the outer circumference side permanent magnets 12a is provided. Also, each of the outer circumference side permanent magnets 12a is fixed so as to be sandwiched by the outer peripheral surface 22A of the outer circumference side rotor core 22 and an inner peripheral surface of the outer circumference side holding member 26.

Also, when the relative phase between the inner circumference side rotor 11 and the outer circumference side rotor 12 is changed by the planetary gear mechanism 14, the long sides of the inner circumference side permanent magnets 11a and the long sides of the outer circumference side permanent magnets 12a may be set so as to radially face each other in a section in a direction parallel to the rotary shaft O.

With the electric motor 10 according to a tenth modified example, the inner circumference side permanent magnets 11a and the outer circumference side permanent magnets 12a can be held appropriately while preventing the shapes of the inner circumference side rotor 11 and the outer circumference side rotor 12 being complicated. Further, by forming a spatial portion having a relatively small magnetic permeability between the inner circumference side permanent magnets 11a that are adjacent to each other in the peripheral direction, it is possible to suppress the occurrence of short-circuiting of the magnetic paths between the magnetic poles of the inner circumference side permanent magnets 11a and the outer circumference side permanent magnets 12a that are not in a mutually facing arrangement relationship.

Hereinafter, the inner circumference side rotor 11 and the outer circumference side rotor 12 of the electric motor 10 according to an eleventh modified example of the above-described embodiment will be explained.

Figure 22:
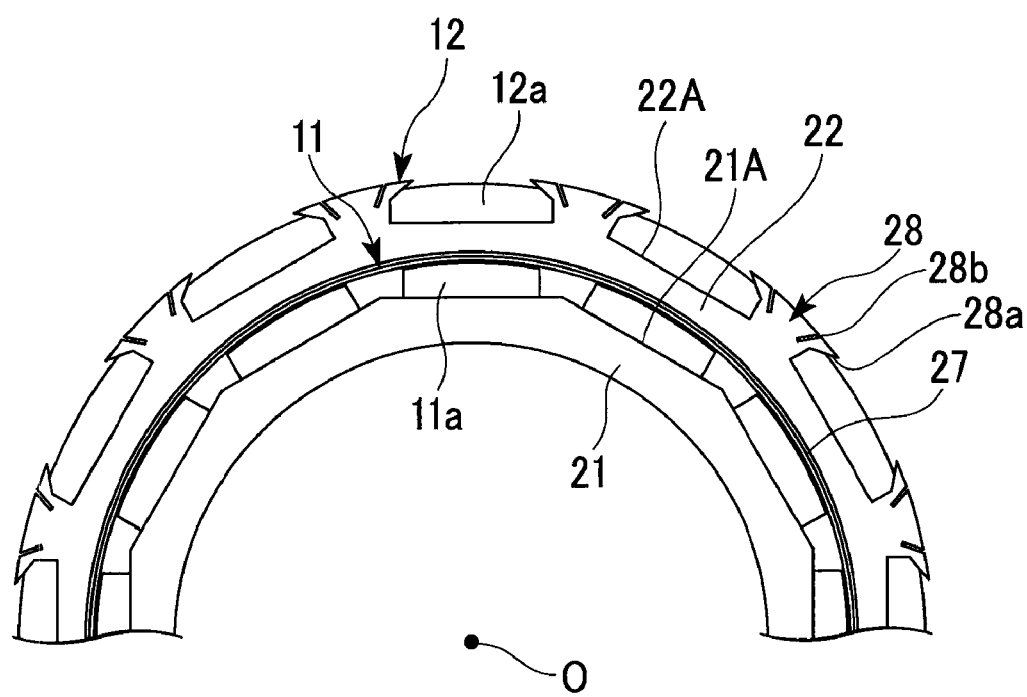
FIG. 22 is a cross-sectional view showing the upper half of an inner circumference side rotor and an outer circumference side rotor of an electric motor according to an eleventh modified example of the embodiment of the present invention.

As shown in, for example, FIG. 22, in the eleventh modified example, each of the inner circumference side permanent magnets 11a is arranged on the outer peripheral surface 21A of the inner circumference side rotor core 21 of the inner circumference side rotor 11, and each of the outer circumference side permanent magnets 12a is arranged on the outer peripheral surface 22A of the outer circumference side rotor core 22 of the outer circumference side rotor 12.

Here, in the inner circumference side rotor 11, a plurality of substantially rectangular plate-like inner circumference side permanent magnets 11a are arranged at predetermined intervals in the peripheral direction on the outer peripheral surface 21A of the inner circumference side rotor core 21, and a substantially cylindrical inner circumference side holding member 27 that abuts on an outer peripheral surface of each of the inner circumference side permanent magnets 11a is provided. Also, each of the inner circumference side permanent magnets 11a is fixed so as to be sandwiched between the outer peripheral surface 21A of the inner circumference side rotor core 21 and an inner peripheral surface of the inner circumference side holding member 27.

Further, in the outer circumference side rotor 12, a plurality of outer circumference side salient pole portions 28 that extend parallel to the rotary shaft O on the outer peripheral surface 22A of the outer circumference side rotor core 22 are provided at predetermined intervals in the peripheral direction. Also, a substantially rectangular plate-like outer circumference side permanent magnet 12a is mounted on the outer peripheral surface 22A of the outer circumference side rotor core 22 so as to be sandwiched on both sides in the peripheral direction between the outer circumference side salient pole portions 28 that are adjacent to each other in the peripheral direction.

Two magnet-holding claw portions 28a that project outward in the peripheral direction are formed at outer circumference side ends of an outer circumference side salient pole portion 28, and the magnet-holding claw portions 28a that project from the outer circumference side salient pole portions 28 that are adjacent to each other in the peripheral direction abut on the outer peripheral surfaces of an outer circumference side permanent magnet 12a mounted between the outer circumference side salient pole portions 28, thereby regulating the radial outward movement of the outer circumference side permanent magnet 12a.

Moreover, magnetic flux barrier grooves 28b that extend radially inward are respective formed in the vicinity of peripheral opposite ends on an outer periphery of an outer circumference side salient pole portion 28.

Also, when the relative phase between the inner circumference side rotor 11 and the outer circumference side rotor 12 is changed by the planetary gear mechanism 14, the long sides of the inner circumference side permanent magnets 11a and the long sides of the outer circumference side permanent magnets 12a may be set so as to radially face each other in a section in a direction parallel to the rotary shaft O.

With the electric motor 10 according to the eleventh modified example, each of the rotors 11 and 12 can be efficiently rotated by using both a magnet torque resulting from the attractive force or repulsive force generated between the rotating magnetic field of the stator windings and each of the permanent magnets 11a and 12a, and a rotating torque, i.e., a reluctance torque, resulting from the attractive force generated between the rotating magnetic field and the outer circumference side salient pole portion 28. Further, by forming a spatial portion having a relatively small magnetic permeability between the inner circumference side permanent magnets 11a that are adjacent to each other in the peripheral direction, it is possible to suppress the occurrence of short-circuiting of the magnetic paths between the magnetic poles of the inner circumference side permanent magnets 11a and the outer circumference side permanent magnets 12a that are not in a mutually facing arrangement relationship.

Figure 23:
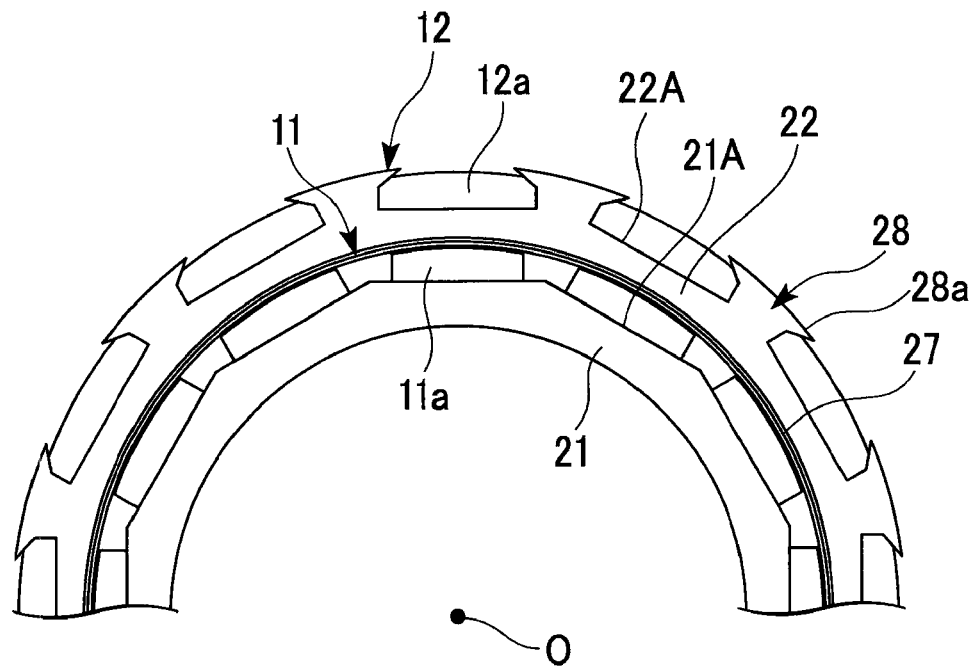
FIG. 23 is a cross-sectional view showing the upper half of the inner circumference side rotor and the outer circumference side rotor of the electric motor according to the eleventh modified example of the embodiment of the present invention.

In addition, in this eleventh modified example, as shown in, for example, FIG. 23, the magnetic flux barrier grooves 28b may be omitted.

Hereinafter, the inner circumference side rotor 11 and the outer circumference side rotor 12 of the electric motor 10 according to a twelfth modified example of the above-described embodiment will be explained.

Figure 24:
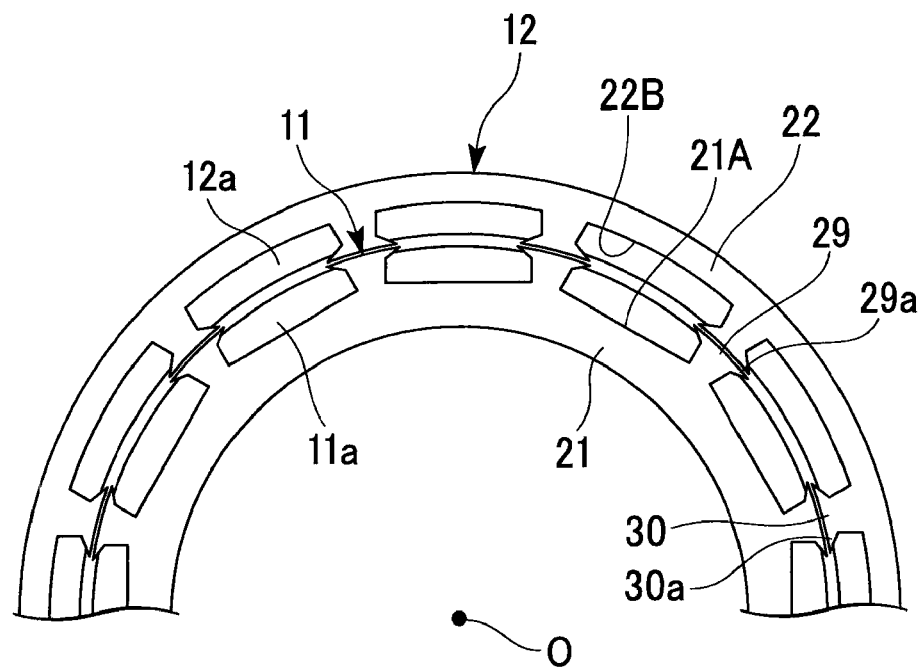
FIG. 24 is a cross-sectional view showing the upper half of an inner circumference side rotor and an outer circumference side rotor of an electric motor according to a twelfth modified example of the embodiment of the present invention.

As shown in, for example, FIG. 24, in the twelfth modified example, each of the inner circumference side permanent magnets 11a is arranged on the outer peripheral surface 21A of the inner circumference side rotor core 21 of the inner circumference side rotor 11, and each of the outer circumference side permanent magnets 12a is arranged on the inner peripheral surface 22B of the outer circumference side rotor core 22 of the outer circumference side rotor 12.

Here, in the inner circumference side rotor 11, a plurality of inner circumference side salient pole portions 29 that extend parallel to the rotary shaft O on the outer peripheral surface 21A of the inner circumference side rotor core 21 are provided at predetermined intervals in the peripheral direction. Also, a substantially rectangular plate-like inner circumference side permanent magnet 11a is mounted on the outer peripheral surface 21A of the inner circumference side rotor core 21 so as to be sandwiched on both sides in the peripheral direction between the inner circumference side salient pole portions 29 that are adjacent to each other in the peripheral direction.

Two magnet-holding claw portions 29a that project outward in the peripheral direction are formed at outer circumference side ends of an inner circumference side salient pole portion 29, and the magnet-holding claw portions 29a that project from the inner circumference side salient pole portions 29 that are adjacent to each other in the peripheral direction abut on the outer peripheral surface of an inner circumference side permanent magnet 11a mounted between the inner circumference side salient pole portions 29, thereby regulating the radial outward movement of the outer circumference side permanent magnet 11a.

Further, in the outer circumference side rotor 12, a plurality of salient pole portions 30 that extend parallel to the rotary shaft O on an outer peripheral surface 22B of the outer circumference side rotor core 22 are provided at predetermined intervals in the peripheral direction. Also, a substantially rectangular plate-like outer circumference side permanent magnet 12a is mounted on the inner peripheral surface 22B of the outer circumference side rotor core 22 so as to be sandwiched on both sides in the peripheral direction between the salient pole portions 30 that are adjacent to each other in the peripheral direction.

Two magnet-holding claw portions 30a that project outward in the peripheral direction are formed at outer circumference side ends of a salient pole portion 30, and the magnet-holding claw portions 30a that project from the salient pole portions 30 that are adjacent to each other in the peripheral direction abut on the inner peripheral surfaces of an outer circumference side permanent magnet 12a mounted between the salient pole portions 30, thereby regulating the radial inward movement of the outer circumference side permanent magnet 12a.

Also, when the relative phase between the inner circumference side rotor 11 and the outer circumference side rotor 12 is changed by the planetary gear mechanism 14, the long sides of the inner circumference side permanent magnets 11a and the long sides of the outer circumference side permanent magnets 12a may be set so as to radially face each other in a section in a direction parallel to the rotary shaft O.

With the electric motor 10 according to the twelfth modified example, the distance between the inner circumference side permanent magnets 11a and the outer circumference side permanent magnets 12a can be shortened, thereby efficiently increasing or decreasing the field fluxes by the permanent magnets 11a and 12a, the field fluxes interlinking with stator windings. Further, each of the rotors 11 and 12 can be efficiently rotated by using both a magnet torque resulting from the attractive force or the repulsive force generated between the rotating magnetic field of the stator windings and each of the permanent magnets 11a and 12a, and a rotating torque, i.e., a reluctance torque, resulting from the attractive force generated between the rotating magnetic field, and the inner circumference side salient pole portions 29 and the salient pole portions 30.

Hereinafter, the inner circumference side rotor 11 and the outer circumference side rotor 12 of the electric motor 10 according to a thirteenth modified example of the above-described embodiment will be explained.

Figure 25:
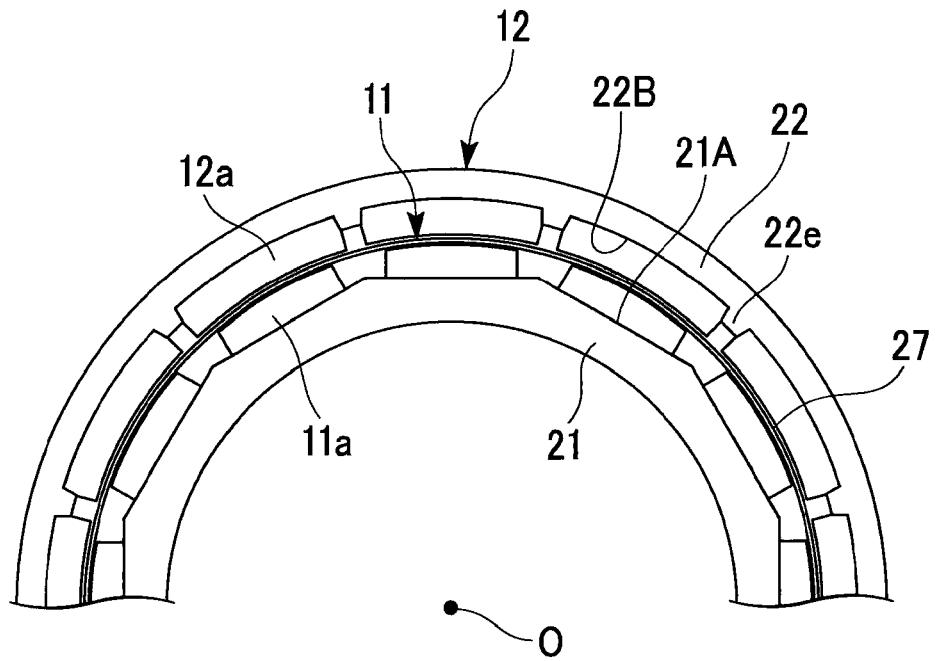
FIG. 25 is a cross-sectional view showing the upper half of an inner circumference side rotor and an outer circumference side rotor of an electric motor according to a thirteenth modified example of the embodiment of the present invention.

As shown in, for example, FIG. 25, in the twelfth modified example, each of the inner circumference side permanent magnets 11a is arranged on the outer peripheral surface 21A of the inner circumference side rotor core 21 of the inner circumference side rotor 11, and each of the outer circumference side permanent magnets 12a is arranged on the inner peripheral surface 22B of the outer circumference side rotor core 22 of the outer circumference side rotor 12.

Here, in the inner circumference side rotor 11, a plurality of substantially rectangular plate-like inner circumference side permanent magnets 11a are arranged at predetermined intervals in the peripheral direction on the outer peripheral surface 21A of the inner circumference side rotor core 21, and a substantially cylindrical inner circumference side holding member 27 that abuts on an outer peripheral surface of each of the inner circumference side permanent magnets 11a is provided. Also, each of the inner circumference side permanent magnets 11a is fixed so as to be sandwiched by the outer peripheral surface 21A of the inner circumference side rotor core 21 and an inner peripheral surface of the inner circumference side holding member 27.

Moreover, in the outer circumference side rotor 12, a plurality of ribs 22e that extend parallel to the rotary shaft O on an outer peripheral surface 22B of the outer circumference side rotor core 22 are provided at predetermined intervals in the peripheral direction. Also, a substantially rectangular plate-like outer circumference side permanent magnet 12a is mounted on the inner peripheral surface 22B of the outer circumference side rotor core 22 so as to be sandwiched on both sides in the peripheral direction between the ribs 22e that are adjacent to each other in the peripheral direction.

Also, when the relative phase between the inner circumference side rotor 11 and the outer circumference side rotor 12 is changed by the planetary gear mechanism 14, the long sides of the inner circumference side permanent magnets 11a and the long sides of the outer circumference side permanent magnets 12a may be set so as to radially face each other in a section in a direction parallel to the rotary shaft O.

With the electric motor 10 according to the thirteenth modified example, the distance between the inner circumference side permanent magnets 11a and the outer circumference side permanent magnets 12a can be shortened, thereby efficiently increasing or decreasing the field fluxes by the permanent magnets 11a and 12a, the field fluxes interlinking with stator windings. Further, by forming a spatial portion having a relatively small magnetic permeability between the inner circumference side permanent magnets 11a that are adjacent to each other in the peripheral direction while the shape of the inner circumference side rotor 11 is simplified, it is possible to suppress the occurrence of short-circuiting of the magnetic paths between the magnetic poles of the inner circumference side permanent magnets 11a and the outer circumference side permanent magnets 12a that are not in a mutually facing arrangement relationship.

Hereinafter, the electric motor 10 according to a fourteenth modified example of the above-described embodiment will be explained.

Figure 26:
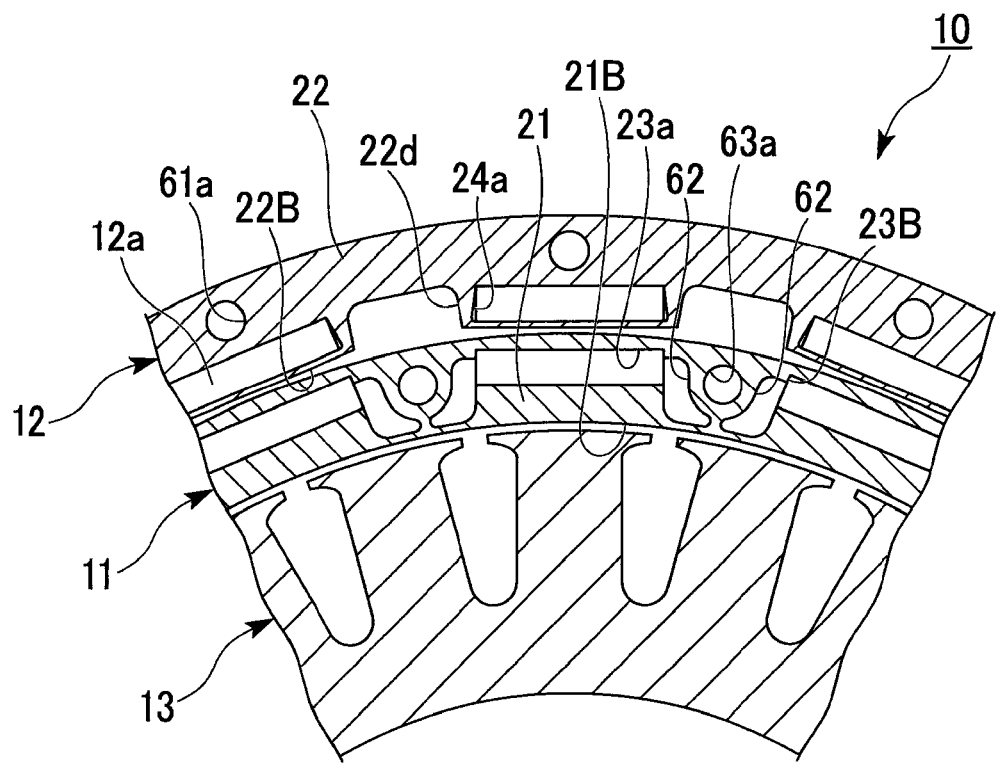
FIG. 26 is a cross-sectional view showing principal portions of an inner circumference side rotor and an outer circumference side rotor of an electric motor according to a fourteenth modified example of the embodiment of the present invention.

As shown in, for example, FIG. 26, in the fourteenth modified example, the stator 13 is formed in a substantially cylindrical shape that is arranged to face an inner peripheral portion of the inner circumference side rotor 11.

Each of the inner circumference side permanent magnets 11a is buried in the inner circumference side rotor core 21 of the inner circumference side rotor 11, and each of the outer circumference side permanent magnets 12a is buried in the outer circumference side rotor core 22 of the outer circumference side rotor 12.

In the outer circumference side rotor 12, a plurality of recesses 22d that extend parallel to the rotary shaft O on an outer peripheral surface 22B of the outer circumference side rotor core 22 are provided at predetermined intervals in the peripheral direction. Moreover, a single magnet mounting hole 24a that passes through the outer circumference side rotor core 22 parallel to the rotary shaft O is provided in a position radially shifted to the inner circumference side between the recesses 22d that are adjacent to each other in the peripheral direction, and each magnet mounting hole 24a is mounted with a substantially rectangular plate-like outer circumference side permanent magnet 12a. Between the recesses 22d that are adjacent to each other in the peripheral direction in the outer peripheral portion of the outer circumference side rotor core 22, a mounting hole 61a that passes the outer peripheral portion parallel to the rotary shaft O is provided. The mounting hole 61a is mounted with a fastening member (not shown), such as a rivet or a bolt, which integrally connects an outer circumference side end surface plate 61 as shown in, for example, FIG. 27, and the outer circumference side rotor core 22.

Between the magnet mounting holes 23a that are adjacent to each other in the peripheral direction, magnetic flux barrier holes 62 that are opened on a peripheral inner wall 23B between the magnet mounting holes 23a, extend toward the inner peripheral surface 21B of the inner circumference side rotor core 21 so as to gradually approach each other, and pass through the inner circumference side rotor core 21 parallel to the rotary shaft O are provided in the inner circumference side rotor core 21 of the inner circumference side rotor 11. Between the inner circumference side permanent magnets 11a that are adjacent to each other in the peripheral direction in the inner circumference side rotor core 21, a region that is sandwiched on both sides in the peripheral direction between the magnetic flux barrier holes 62. This region is provided with a mounting hole 63a that passes through the region parallel to the rotary shaft O. The mounting hole 63a is mounted with a fastening member (not shown), such as a rivets or bolt, which integrally connects an outer circumference side end surface plate 63 as shown in, for example, FIG. 27, and the outer circumference side rotor core 11.

In the fourteenth modified example, the electric motor 10 includes a phase change mechanism section 70 connected to the inner circumference side rotor 11 and the outer circumference side rotor 12 instead of the planetary gear mechanism 14 in the above-described embodiment, and a hydraulic actuator 71 that sets the relative phase between the inner circumference side rotor 11 and the outer circumference side rotor 12 by the phase change mechanism section 70.

Figure 27:
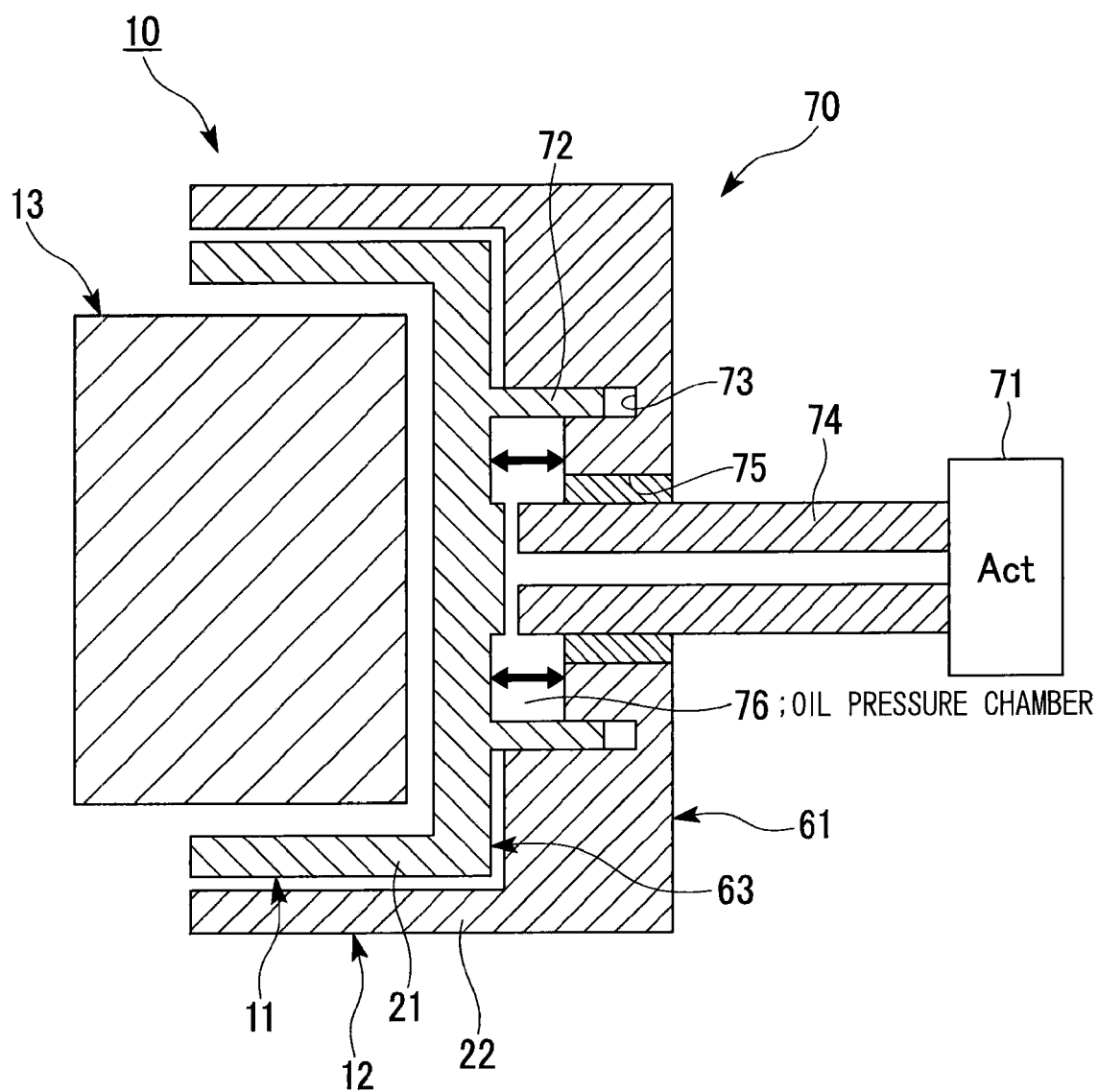
FIG. 27 is a view schematically showing the configuration of the electric motor according to the fourteenth modified example of the embodiment of the present invention.

As shown in, for example, FIG. 27, the phase change mechanism section 70 includes a tubular guide member 72 that protrudes coaxially with the rotary shaft O from above the surface of the inner circumference side end surface plate 63 connected to the inner circumference side rotor core 21, an annular mounting recess 73 that is provided on the surface of the outer circumference side end surface plate 61 connected to the outer circumference side rotor core 22, and on which the guide member 72 is slidably and liquid-tightly mounted, and a hollow shaft member 74 to be used as a passage for the working oil supplied from the hydraulic actuator 71.

For example, the shaft member 74 fixed to a housing (not shown) of a transmission of a vehicle or the like has an external diameter smaller than the guide member 72, and is relatively movably and air-tightly mounted in a through hole 75 that passes through the outer circumference side end surface plate 61 coaxially with the rotary shaft O and has an internal diameter smaller than the mounting recess 73.

Thereby, working oil is supplied to an oil pressure chamber 76, which is formed by the inner circumference side end surface plate 63 and the guide member 72, the outer circumference side end surface plate 61, and the shaft member 74, via a flow passage inside the hollow shaft member 74 from the hydraulic actuator 71.

Also, a helical spline G1 is formed on an outer peripheral surface of the shaft member 74, and a helical spline G2 that meshes with the helical spline G1 is formed on an inner peripheral surface of the through hole 75. Thereby, according to the oil pressure of the working oil supplied to the oil pressure chamber 76 from the hydraulic actuator 71, the outer circumference side rotor 12 to be used as a field-controlling rotor rotates (that, makes a spiral motion) while moving along the rotary shaft O, and the relative phase between the inner circumference side rotor 11 to be used as a driving rotor that outputs the driving force of the electric motor 10, and the outer circumference side rotor 12 is changed.

Figure 28:
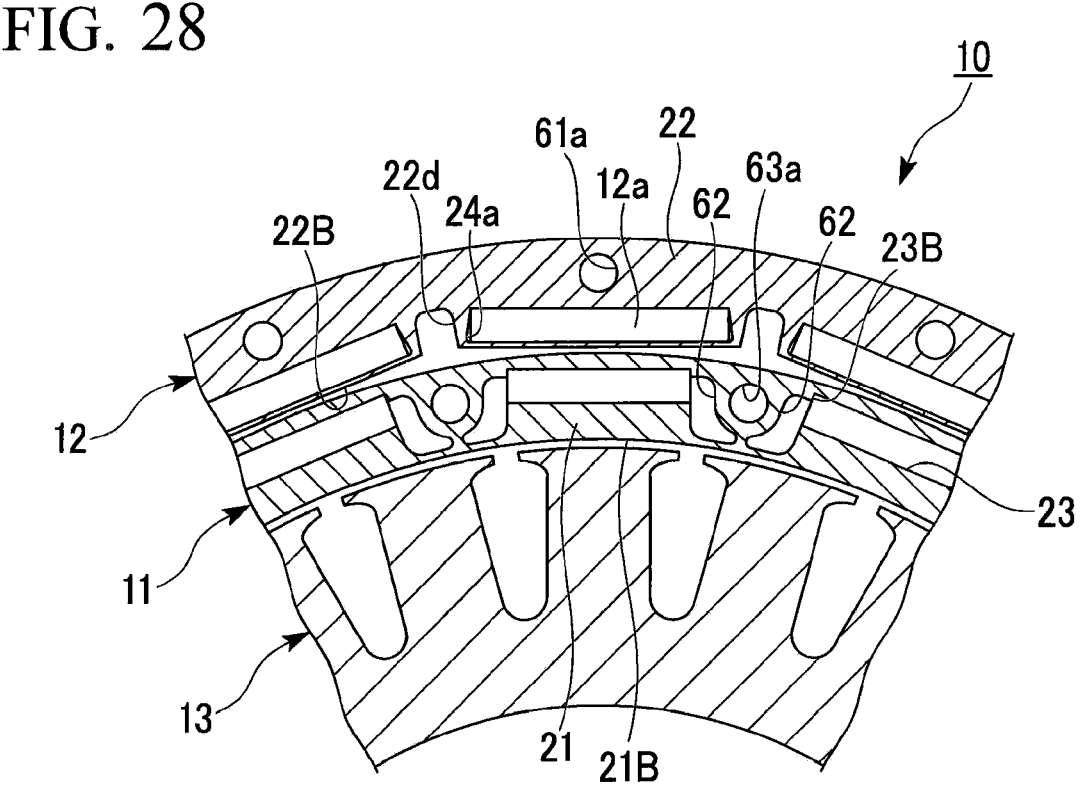
FIG. 28 is a cross-sectional view showing principal portions of the inner circumference side rotor and the outer circumference side rotor of the electric motor according to the fourteenth modified example of the embodiment of the present invention.
Figure 29:
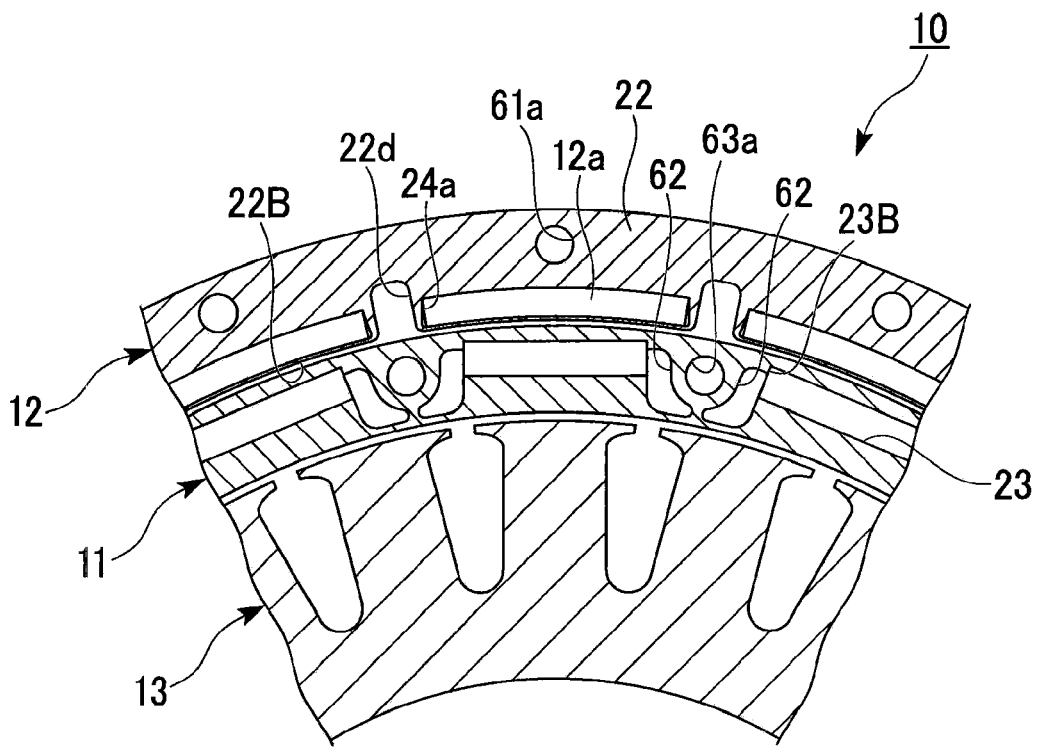
FIG. 29 is a cross-sectional view showing principal portions of the inner circumference side rotor and the outer circumference side rotor of the electric motor according to the fourteenth modified example of the embodiment of the present invention.
Figure 30:
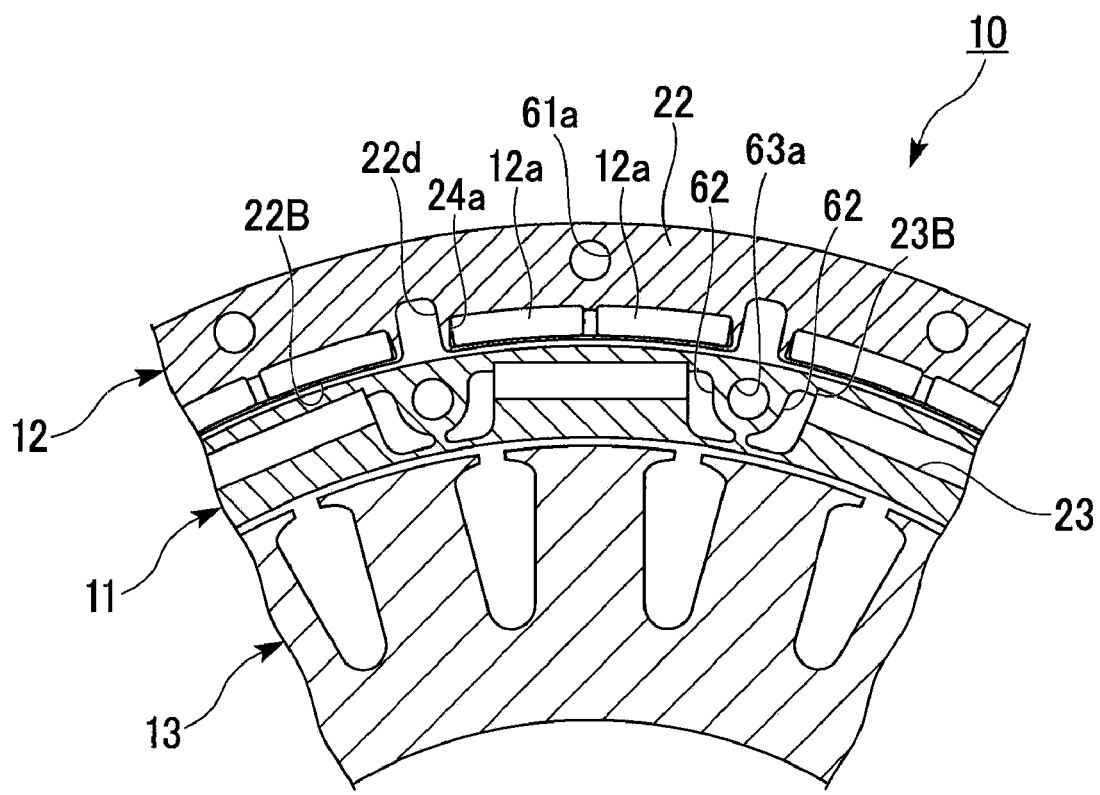
FIG. 30 is a cross-sectional view showing principal portions of the inner circumference side rotor and the outer circumference side rotor of the electric motor according to the fourteenth modified example of the embodiment of the present invention.

In addition, in the fourteenth modified example, as shown in, for example, FIGS. 28 to 30, with respect to the inner circumference side permanent magnets 11a and the outer circumference side permanent magnets 12a whose long sides face each other, the long sides of the outer circumference side permanent magnets 12a may be set to be longer than the long sides of the inner circumference side permanent magnets 11a.

In the electric motor 10 shown in, for example, FIG. 28, the inner circumference side permanent magnets 11a and the outer circumference side permanent magnets 12a are formed in the shape of a rectangular plate, and the long sides of the outer circumference side permanent magnets 12a are formed so as to be longer than the long sides of the inner circumference side permanent magnets 11a.

Further, in the electric motor 10 shown in, for example, FIG. 29, the inner circumference side permanent magnets 11a are formed in the shape of a rectangular plate, the outer circumference side permanent magnets 12a are formed in the shape of a plate that is curved in the peripheral direction of the outer circumference side rotor core 22, and the long sides of the outer circumference side permanent magnets 12a in their peripheral direction are formed so as to be longer than the long sides of the inner circumference side permanent magnets 11a.

Further, in the electric motor 10 shown in, for example, FIG. 30, one pair of outer circumference side permanent magnets 12a are arranged to face each of the inner circumference side permanent magnets 11a, and the sum of the long sides of one pair of outer circumference side permanent magnets 12a is set to be longer than the long side of each of the inner circumference side permanent magnets 11a.

With the electric motor 10 according to the fourteenth modified example, the versatility of the electric motor 10 can be improved by using the electric motor 10 as an outer rotor.

Moreover, by setting the long sides of the outer circumference side permanent magnets 12a so as to be longer than the long sides of the inner circumference side permanent magnets 11a, thereby increasing the intensity of the outer circumference side permanent magnets 12a of the outer circumference side rotor 12 that is a field-controlling rotor arranged in a position that is relatively distant from the stator 13, the amount of magnetic fluxes can be increased and the variable range of an induced voltage constant of the electric motor 10 can be expanded.

Hereinafter, the inner circumference side rotor 11 and the outer circumference side rotor 12 of the electric motor 10 according to a fifteenth modified example of the above-described embodiment will be explained.

Figure 31:
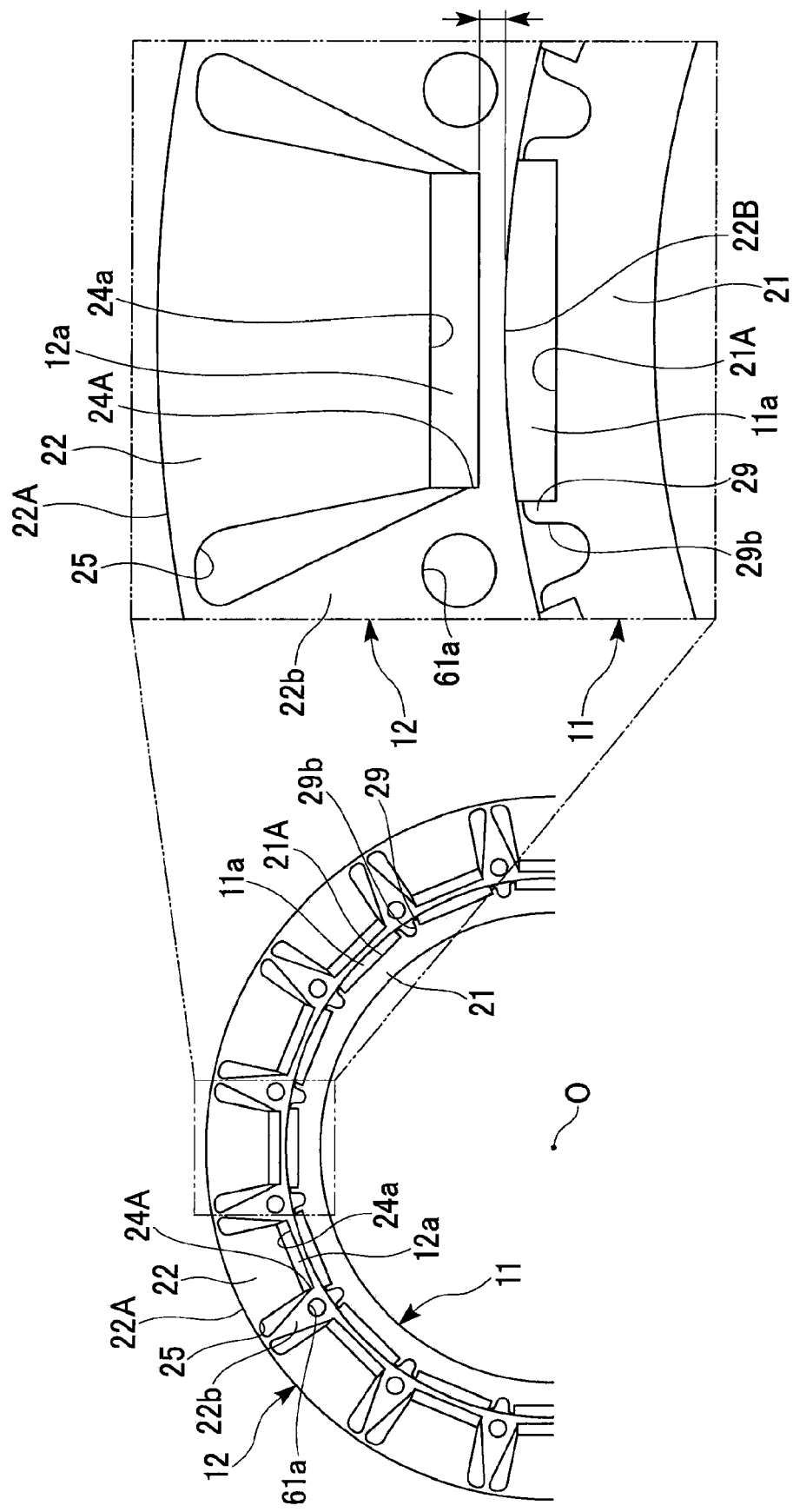
FIG. 31 is a cross-sectional view showing principal portions of an inner circumference side rotor and an outer circumference side rotor of an electric motor according to a fifteenth modified example of the embodiment of the present invention.

As shown in, for example, FIG. 31, in the fifteenth modified example, each of the inner circumference side permanent magnets 11a is arranged on the outer peripheral surface 21A of the inner circumference side rotor core 21 of the inner circumference side rotor 11.

Here, in the inner circumference side rotor 11, a plurality of inner circumference side salient pole portions 29 that extend parallel to the rotary shaft O on the outer peripheral surface 21A of the inner circumference side rotor core 21 are provided at predetermined intervals in the peripheral direction. Also, a substantially rectangular plate-like inner circumference side permanent magnet 11a is mounted on the outer peripheral surface 21A of the inner circumference side rotor core 21 so as to be sandwiched on both sides in the peripheral direction between the inner circumference side salient pole portions 29 that are adjacent to each other in the peripheral direction. Further, recesses 29b that extend parallel to the rotary shaft O are provided in the inner circumference side salient pole portions 29.

Moreover, in the outer circumference side rotor 12, a plurality of magnet mounting holes 24a that pass through the outer circumference side rotor core 22 parallel to the rotary shaft O are provided in positions that are spaced at predetermined intervals in the peripheral direction and radially shifted to the inner circumference side, and each of the magnet mounting holes 24a is mounted with a substantially rectangular plate-like outer circumference side permanent magnet 12a. Moreover, between the magnet mounting holes 24a that are adjacent to each other in the peripheral direction, magnetic flux barrier holes 25 that are opened on a peripheral inner wall 24A between the magnet mounting holes 24a, extend toward the outer peripheral surface 22A of the outer circumference side rotor core 22 so as to gradually approach each other, and pass through the outer circumference side rotor core 22 parallel to the rotary shaft O are provided in the outer circumference side rotor core 22. Thereby, a core portion 22b that is sandwiched on both sides in the peripheral direction between the magnetic flux barrier holes 25 having a relatively small magnetic permeability is formed between the outer circumference side permanent magnets 12a that are adjacent to each other in the peripheral direction in the outer circumference side rotor core 22. The core portion 22b is provided with the mounting hole 61a passing through the core portion parallel to the rotary shaft O. The mounting hole 61a is mounted with a fastening member (not shown), such as a rivet or a bolt, which integrally connects an outer circumference side end surface plate (not shown), and the outer circumference side rotor core 22.

Also, the inner circumference side permanent magnets 11a abut on the inner peripheral surface 22B of the outer circumference side rotor core 22 of the outer circumference side rotor 12.

With the electric motor 10 according to the fifteenth modified example, the distance between the inner circumference side permanent magnets 11a and the outer circumference side permanent magnets 12a can be shortened, thereby reducing the magnetic resistance, and expanding the variable range of an induced voltage constant of the electric motor 10.

Figure 32:
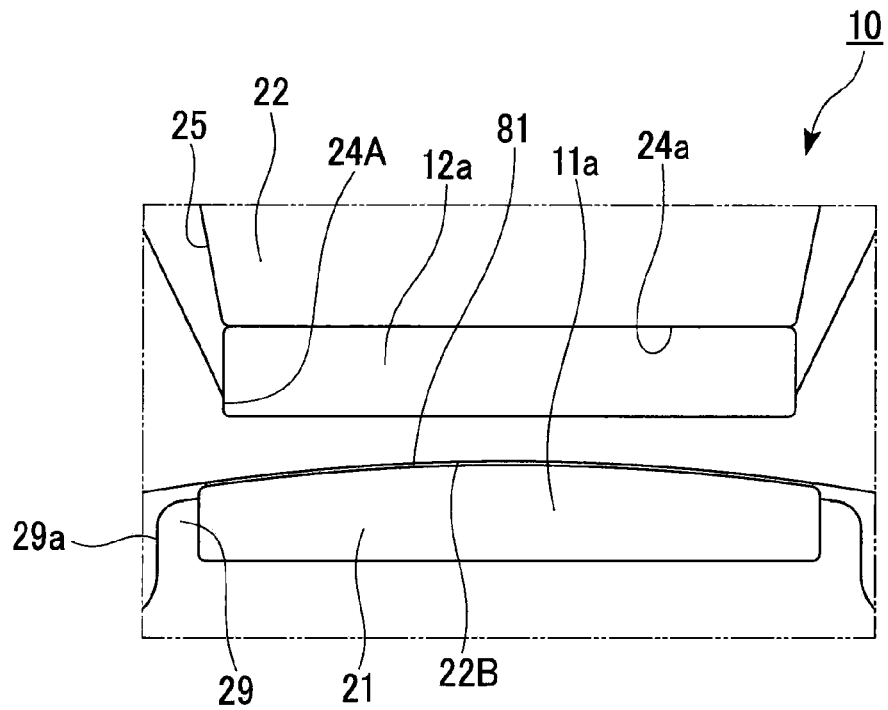
FIG. 32 is a cross-sectional view showing principal portions of the inner circumference side rotor and the outer circumference side rotor of the electric motor according to the fifteenth modified example of the embodiment of the present invention.
Figure 33:
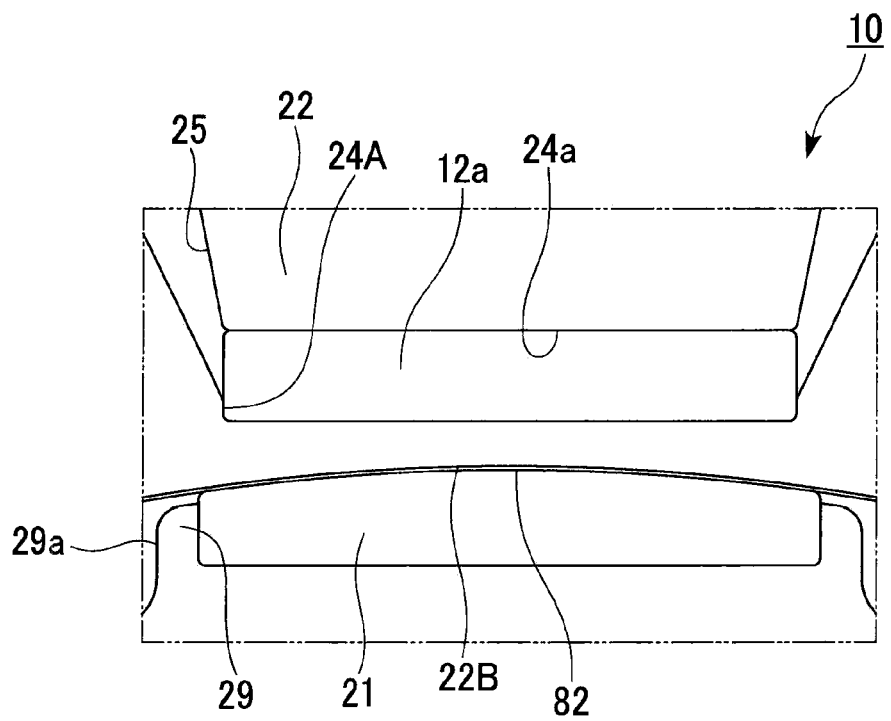
FIG. 33 is a cross-sectional view showing principal portions of the inner circumference side rotor and the outer circumference side rotor of the electric motor according to the fifteenth modified example of the embodiment of the present invention.

In addition, in the fifteenth modified example, as shown in, for example, FIGS. 32 and 33, a coating layer 81 by predetermined surface treatment (e.g., smoothing, curing, or the like) may be provided on the abutting surfaces of the inner circumference side permanent magnets 11a that abut on the inner peripheral surface 22B of the outer circumference side rotor core 22 of the outer circumference side rotor 12, or a coating layer 82 by predetermined surface treatment (e.g., smoothing, curing, or the like) may be provided on the inner peripheral surface 22B of the outer circumference side rotor core 22 of the outer circumference side rotor 12 that abuts on the inner circumference side permanent magnets 11a. Thereby, for example by the smoothing of the inner peripheral surface 22B of the outer circumference side rotor core 22 of the outer circumference side rotor 12, the sliding resistance when the inner circumference side rotor 11 and the outer circumference side rotor 12 are relatively rotated in the peripheral direction can be reduced, and the consumption of the energy that is required for this rotation can be reduced. Further, for example by the curing of the inner peripheral surface 22B of the outer circumference side rotor core 22 of the outer circumference side rotor 12, the occurrence of problems, such as an increase in the magnetic resistance by the wear of the outer circumference side rotor 12 can be suppressed.

Figure 34:
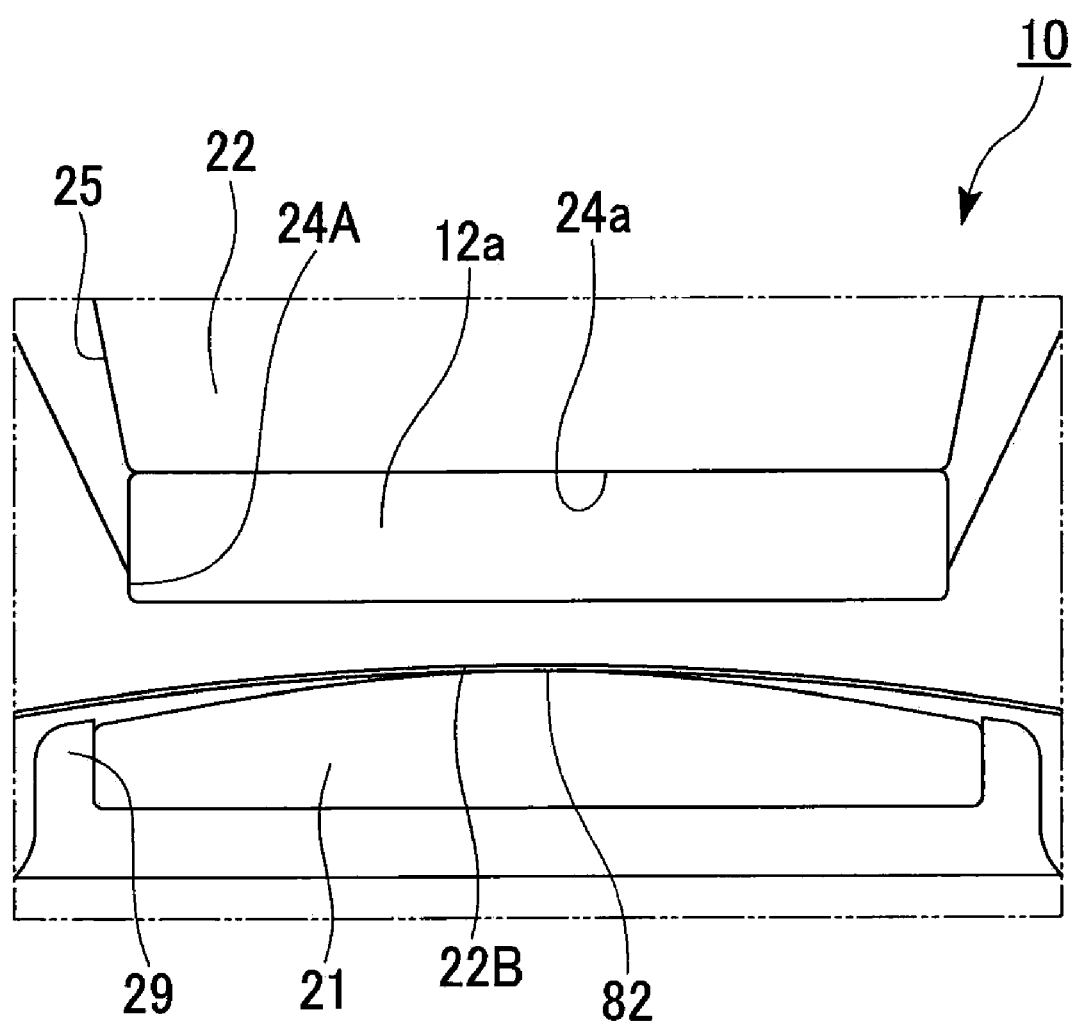
FIG. 34 is a cross-sectional view showing principal portions of the inner circumference side rotor and the outer circumference side rotor of the electric motor according to the fifteenth modified example of the embodiment of the present invention.

Further, as shown in, for example, FIG. 34, the surfaces of the inner circumference side permanent magnets 11a that abut on the inner peripheral surface 22B of the outer circumference side rotor core 22 of the outer circumference side rotor 12 may be formed in a convex shape, and the surfaces of contact between the inner peripheral surface 22B of the outer circumference side rotor core 22 and the inner circumference side permanent magnets 11a may be set so as to be relatively small. Thereby, the sliding resistance when the inner circumference side rotor 11 and the outer circumference side rotor 12 are relatively rotated in the peripheral direction can be reduced, and the consumption of the energy that is required for this rotation can be reduced.

INDUSTRIAL APPLICABILITY

The invention is suitable to be used as a traveling drive source and a power generator that are mounted on a vehicle.

The invention claimed is:

1. An electric motor, comprising:
   an inner circumference side rotor,
   an outer circumference side rotor having a rotary shaft that is coaxial with a rotary shaft of the inner circumference side rotor; and
   a rotating device capable of changing the relative phase between the inner circumference side rotor and the outer circumference side rotor by rotating at least one of the inner circumference side rotor and the outer circumference side rotor around the rotary shaft, wherein
   the inner circumference side rotor includes substantially plate-like inner circumference side permanent magnets arranged along a peripheral direction;
   the outer circumference side rotor includes substantially plate-like outer circumference side permanent magnets arranged along the peripheral direction;
   the inner circumference side permanent magnets and the outer circumference side permanent magnets include long sides that face each other, in a cross section perpendicular to the rotary shaft, by the rotation of at least one of the inner circumference side rotor and the outer circumference side rotor with the rotating device; and
   at least one of outer circumference side permanent magnets and inner circumference side permanent magnets abut on an unaffixed core surface of a separate rotor.

2. The electric motor according to claim 1, wherein
   the inner circumference side permanent magnets are arranged on an outer peripheral surface of a core of the inner circumference side rotor; and
   the outer circumference side permanent magnets are buried in a core of the outer circumference side rotor.

3. The electric motor according to claim 2, wherein the inner circumference side permanent magnets abut on an inner peripheral surface of the outer circumference side rotor.

4. The electric motor according to claim 3, wherein abutting surfaces of the inner circumference side permanent magnets with the outer circumference side rotor are subjected to a predetermined surface treatment.

5. The electric motor according to claim 3, wherein the inner peripheral surface of the outer circumference side rotor is subjected to a predetermined surface treatment.

6. The electric motor according to claim 1, wherein
   the inner circumference side permanent magnets are buried in a core of the inner circumference side rotor; and
   the outer circumference side permanent magnets are buried in a core of the outer circumference side rotor.

7. The electric motor according to claim 6, wherein the inner circumference side rotor and the outer circumference side rotor include a spatial portion provided in the core of the inner circumference side rotor between the inner circumference side permanent magnets that are adjacent to each other in the peripheral direction and in the core of the outer circumference side rotor between the outer circumference side permanent magnets that are adjacent to each other in the peripheral direction.

8. The electric motor according to claim 7, wherein the spatial portion includes:
   an inner circumference side rotor groove that is provided on an outer peripheral surface of the core of the inner circumference side rotor and extends in the direction parallel to the rotary shaft; and
   an outer circumference side rotor groove that is provided on the inner peripheral surface of the outer circumference side rotor and extends in the direction parallel to the rotary shaft.

9. The electric motor according to claim 7, wherein the spatial portion includes:
   an inner circumference side rotor groove that is provided on an outer peripheral surface of the core of the inner circumference side rotor and extends in the direction parallel to the rotary shaft;
   a pair of outer circumference side rotor grooves that are provided on an outer peripheral surface of each of the one or more cores between the outer circumference side permanent magnets that are adjacent to each other in the peripheral direction of the outer circumference side rotor and extend in the direction parallel to the rotary shaft; and
   a salient pole portion which is provided so as to be sandwiched between the pair of outer circumference side rotor grooves on both sides thereof in the peripheral direction.

10. The electric motor according to claim 7, wherein the spatial portion provided between the outer circumference side permanent magnets extends toward the outer peripheral surface of the outer circumference side rotor from the vicinity of peripheral ends of the outer circumference side permanent magnets.

11. The electric motor according to claim 6, wherein
    the inner circumference side permanent magnets are arranged in positions shifted to the outer circumference side in a radial direction of the core of the inner circumference side rotor; and
    the outer circumference side permanent magnets are arranged in positions shifted to the inner circumference side in a radial direction of the core of the outer circumference side rotor.

12. The electric motor according to claim 1, wherein
    the inner circumference side permanent magnets are buried in a core of the inner circumference side rotor; and
    the outer circumference side permanent magnets are arranged on an outer peripheral surface of a core of the outer circumference side rotor.

13. The electric motor according to claim 1, wherein
    the inner circumference side permanent magnets are arranged on an outer peripheral surface of a core of the inner circumference side rotor; and
    the outer circumference side permanent magnets are arranged on an outer peripheral surface of a core of the outer circumference side rotor.

14. The electric motor according to claim 13, wherein a salient pole portion that protrudes radially outward from the outer peripheral surface of the core is provided between the outer circumference side permanent magnets that are adjacent to each other in the peripheral direction.

15. The electric motor according to claim 13, wherein the inner circumference side permanent magnets abut on an inner peripheral surface of the outer circumference side rotor.

16. The electric motor according to claim 15, wherein abutting surfaces of the inner circumference side permanent magnets with the outer circumference side rotor are subjected to a predetermined surface treatment.

17. The electric motor according to claim 15, wherein the inner peripheral surface of the outer circumference side rotor is subjected to a predetermined surface treatment.

18. The electric motor according to claim 1, wherein
the inner circumference side permanent magnets are arranged on an outer peripheral surface of a core of the inner circumference side rotor; and
the outer circumference side permanent magnets are arranged on an inner peripheral surface of a core of the outer circumference side rotor.

19. The electric motor according to claim 18, further comprising:
an inner circumference side salient pole portion that protrudes radially outward from the outer peripheral surface of the core between the inner circumference side permanent magnets that are adjacent to each other in the peripheral direction;
an outer circumference side salient pole portion that protrudes radially inward from the inner peripheral surface of the core between the outer circumference side permanent magnets that are adjacent to each other in the peripheral direction;
an inner circumference side permanent-magnet-holding claw portion that protrudes substantially in the peripheral direction from the inner circumference side salient pole portion and abuts on an outer peripheral surface end of each of the inner circumference side permanent magnets; and
an outer circumference side permanent-magnet-holding claw portion that protrudes substantially in the peripheral direction from the outer circumference side salient pole portion and abuts on an inner peripheral surface end of each of the outer circumference side permanent magnets.

20. The electric motor according to claim 1, further comprising a substantially annular holding member in which at least one of the inner circumference side permanent magnets arranged on an outer peripheral surface of a core of the inner circumference side rotor or the outer circumference side permanent magnets arranged on an outer peripheral surface of a core of the outer circumference side rotor is sandwiched and held on both sides thereof in the radial direction between the holding member and the outer peripheral surface of the core.

21. The electric motor according to claim 1, wherein any one of the inner circumference side rotor and the outer circumference side rotor is a driving rotor that is arranged so as to face a stator and is driven by a magnetic field generated by the stator, and the other rotor is a field-controlling rotor.

22. The electric motor according to claim 21, wherein
the stator is arranged on the inner circumference side of the inner circumference side rotor; and
the long sides of the outer circumference side permanent magnets provided in the outer circumference side rotor that is the field-controlling rotor are longer than those of the inner circumference side permanent magnets.

23. The electric motor according to any one of claims 3 to 17, wherein
an outer peripheral surface of the inner circumference side permanent magnets are formed in a convex shape, and
part of the outer peripheral surface of the inner circumference side permanent magnets abuts on the inner peripheral surface of the outer circumference side rotor, and a remainder part of the outer peripheral surface of the inner circumference side permanent magnets is arranged in a position that is relatively distant from the inner peripheral surface of the outer circumference side rotor.

* * * * *

UNITED STATES PATENT AND TRADEMARK OFFICE
CERTIFICATE OF CORRECTION

PATENT NO. : 8,339,010 B2
APPLICATION NO. : 12/158533
DATED : December 25, 2012
INVENTOR(S) : Hirofumi Atarashi Page 1 of 1

It is certified that error appears in the above-identified patent and that said Letters Patent is hereby corrected as shown below:

(87) PCT Pub. No.: WO2007/672622 should read:
   PCT Pub No.: WO2007/072622

Signed and Sealed this
Twelfth Day of March, 2013

Teresa Stanek Rea
*Acting Director of the United States Patent and Trademark Office*